United States Patent
Peck-Walden et al.

(10) Patent No.: US 11,823,267 B2
(45) Date of Patent: *Nov. 21, 2023

(54) CENTRAL LIMIT ORDER BOOK AUTOMATIC TRIANGULATION SYSTEM

(71) Applicant: Chicago Mercantile Exchange Inc., Chicago, IL (US)

(72) Inventors: Pearce Peck-Walden, Chicago, IL (US); Ryan Eavy, Chicago, IL (US); Dileep Konduru, Schaumburg, IL (US); Zachary Bonig, Skokie, IL (US); Ari Studnitzer, Northbrook, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/672,185

(22) Filed: Feb. 15, 2022

(65) Prior Publication Data

US 2022/0172292 A1    Jun. 2, 2022

Related U.S. Application Data

(63) Continuation of application No. 15/135,112, filed on Apr. 21, 2016, now Pat. No. 11,288,739.

(60) Provisional application No. 62/240,280, filed on Oct. 12, 2015.

(51) Int. Cl.
*G06Q 40/04* (2012.01)
(52) U.S. Cl.
CPC .................................. *G06Q 40/04* (2013.01)
(58) Field of Classification Search
CPC .................................................... G06Q 40/04
See application file for complete search history.

(56) References Cited

U.S. PATENT DOCUMENTS

| 4,093,823 | A | 6/1978 | Chu |
| 5,077,665 | A | 12/1991 | Silverman et al. |
| 5,297,032 | A | 3/1994 | Trojan et al. |
| 5,465,308 | A | 11/1995 | Hutcheson et al. |

(Continued)

FOREIGN PATENT DOCUMENTS

| EP | 0411748 A2 | 2/1991 |
| JP | 2002-183446 | 6/2002 |

(Continued)

OTHER PUBLICATIONS

"A Scalable Fault-Tolerant Limit Order Book", Rutgers University, Jun. 9, 2007, 3 pages, http://web.archive.org/web/20070609124316/http://www.cs.rutgers.edu/~rmartin/projects/market/index.html.

(Continued)

*Primary Examiner* — Ojo O Oyebisi
(74) *Attorney, Agent, or Firm* — Lempia Summerfield Katz LLC

(57) ABSTRACT

The disclosed embodiments relate to systems and methods for triangulation of options and futures. An exchange receives a volatility quoted order. The system attempts to match the order within a volatility order book. If there is a match, the system attempts to mitigate the risk of the order by implying an order into the futures market. If there is not a match, the system implies an order into a premium quoted option order book. The exchange automatically maintains the order based on changes in the underlying futures market and a stored quoting model.

20 Claims, 6 Drawing Sheets

(56) References Cited

U.S. PATENT DOCUMENTS

| | | |
|---|---|---|
| 5,557,780 A | 9/1996 | Edwards et al. |
| 5,727,165 A | 3/1998 | Ordish et al. |
| 5,909,570 A | 6/1999 | Webber |
| 5,924,082 A | 7/1999 | Silverman et al. |
| 5,950,176 A | 9/1999 | Keiser et al. |
| 5,953,503 A | 9/1999 | Mitzenmacher et al. |
| 6,016,483 A | 1/2000 | Rickard et al. |
| 6,018,722 A | 1/2000 | Ray et al. |
| 6,031,577 A | 2/2000 | Ozkan et al. |
| 6,061,662 A | 5/2000 | Makivic |
| 6,088,699 A | 7/2000 | Gampper et al. |
| 6,131,087 A | 10/2000 | Uke et al. |
| 6,195,024 B1 | 2/2001 | Fallon |
| 6,195,647 B1 | 2/2001 | Martyn et al. |
| 6,236,972 B1 | 5/2001 | Shkedy |
| 6,263,321 B1 | 7/2001 | Daughtery, III |
| 6,278,982 B1 | 8/2001 | Korhammer et al. |
| 6,282,521 B1 | 8/2001 | Howorka |
| 6,309,424 B1 | 10/2001 | Fallon |
| 6,317,727 B1 | 11/2001 | May |
| 6,321,212 B1 | 11/2001 | Lange |
| 6,347,307 B1 | 2/2002 | Sandhu et al. |
| 6,360,210 B1 | 3/2002 | Wallman |
| 6,418,419 B1 | 7/2002 | Nieboer et al. |
| 6,421,653 B1 | 7/2002 | May |
| 6,463,470 B1 | 10/2002 | Mohaban et al. |
| 6,466,944 B1 | 10/2002 | Stokes |
| 6,505,174 B1 | 1/2003 | Keiser et al. |
| 6,549,949 B1 | 4/2003 | Bowman-Amuah |
| 6,597,812 B1 | 7/2003 | Fallon et al. |
| 6,601,104 B1 | 7/2003 | Fallon |
| 6,604,158 B1 | 8/2003 | Fallon |
| 6,618,707 B1 | 9/2003 | Gary |
| 6,624,761 B2 | 9/2003 | Fallon |
| 6,694,054 B1 | 2/2004 | Gardes et al. |
| 6,748,457 B2 | 6/2004 | Fallon et al. |
| 6,801,201 B2 | 10/2004 | Escher |
| 6,950,445 B2 | 9/2005 | Svanbro et al. |
| 6,963,855 B1 | 11/2005 | Borzenko |
| 7,024,387 B1 | 4/2006 | Nieboer et al. |
| 7,082,398 B1 | 7/2006 | Apple et al. |
| 7,089,204 B1 | 8/2006 | Nieboer et al. |
| 7,130,913 B2 | 10/2006 | Fallon |
| 7,143,191 B2 | 11/2006 | Chuah et al. |
| 7,152,041 B2 | 12/2006 | Salavadori et al. |
| 7,161,506 B2 | 1/2007 | Fallon |
| 7,181,608 B2 | 2/2007 | Fallon et al. |
| 7,228,129 B1 | 6/2007 | Ward et al. |
| 7,321,937 B2 | 1/2008 | Fallon |
| 7,352,300 B2 | 4/2008 | Fallon |
| 7,358,867 B2 | 4/2008 | Allon |
| 7,376,772 B2 | 5/2008 | Fallon |
| 7,378,992 B2 | 5/2008 | Fallon |
| 7,386,046 B2 | 6/2008 | Fallon et al. |
| 7,395,345 B2 | 7/2008 | Fallon |
| 7,400,274 B2 | 7/2008 | Fallon et al. |
| 7,415,530 B2 | 8/2008 | Fallon |
| 7,417,568 B2 | 8/2008 | Fallon et al. |
| 7,440,917 B2 | 10/2008 | Farrell et al. |
| 7,552,077 B1 | 6/2009 | Schluetter et al. |
| 7,565,319 B1 | 7/2009 | Strauss et al. |
| 7,571,133 B2 | 8/2009 | Farrell et al. |
| 7,636,703 B2 | 12/2009 | Taylor |
| 7,685,049 B1 | 3/2010 | Singer |
| 7,831,491 B2 | 11/2010 | Newell et al. |
| 7,840,482 B2 | 11/2010 | Singla et al. |
| 7,853,499 B2 | 12/2010 | Czupek et al. |
| 7,899,749 B1 | 3/2011 | Studnitzer et al. |
| 7,921,046 B2 | 4/2011 | Parsons et al. |
| 7,954,114 B2 | 5/2011 | Chamberlain et al. |
| 8,027,904 B2 | 9/2011 | O'Callahan |
| 8,036,929 B1 | 10/2011 | Reisman |
| 8,041,626 B2 | 10/2011 | Kirwin et al. |
| 8,060,435 B2 | 11/2011 | Kirwin et al. |
| 8,069,102 B2 | 11/2011 | Indeck et al. |
| 8,131,625 B2 | 3/2012 | Langridge |
| 8,296,217 B1 | 10/2012 | Howorka |
| 8,407,122 B2 | 3/2013 | Parsons et al. |
| 8,458,081 B2 | 6/2013 | Parsons et al. |
| 8,548,900 B1 | 10/2013 | Glackin et al. |
| 2001/0032163 A1 | 10/2001 | Fertik et al. |
| 2001/0034695 A1 | 10/2001 | Wilkinson |
| 2001/0042036 A1 | 11/2001 | Sanders |
| 2001/0044771 A1 | 11/2001 | Usher et al. |
| 2001/0047473 A1 | 11/2001 | Fallon |
| 2001/0052038 A1 | 12/2001 | Fallon et al. |
| 2002/0002530 A1 | 1/2002 | May |
| 2002/0004774 A1 | 1/2002 | Defarlo |
| 2002/0016760 A1 | 2/2002 | Pathak |
| 2002/0038276 A1 | 3/2002 | Buhannic et al. |
| 2002/0065755 A1 | 5/2002 | Shlafman et al. |
| 2002/0069155 A1 | 6/2002 | Nafeh et al. |
| 2002/0080871 A1 | 6/2002 | Fallon et al. |
| 2002/0082967 A1 | 6/2002 | Kaminsky et al. |
| 2002/0099647 A1 | 7/2002 | Howorka et al. |
| 2002/0099651 A1 | 7/2002 | May |
| 2002/0116317 A1 | 8/2002 | May |
| 2002/0128938 A1 | 9/2002 | Ronald Schofield et al. |
| 2002/0128955 A1 | 9/2002 | Brady et al. |
| 2002/0128958 A1 | 9/2002 | Slone |
| 2002/0133456 A1 | 9/2002 | Ancaster et al. |
| 2002/0138390 A1 | 9/2002 | May |
| 2002/0156719 A1 | 10/2002 | Finebaum et al. |
| 2002/0169703 A1 | 11/2002 | Lutnick et al. |
| 2002/0174055 A1 | 11/2002 | Dick et al. |
| 2002/0191692 A1 | 12/2002 | Fallon et al. |
| 2002/0194115 A1 | 12/2002 | Nordlicht et al. |
| 2003/0004853 A1 | 1/2003 | Ram et al. |
| 2003/0009411 A1 | 1/2003 | Ram et al. |
| 2003/0023536 A1 | 1/2003 | Hollerman et al. |
| 2003/0028476 A1 | 2/2003 | Jenkins et al. |
| 2003/0033212 A1 | 2/2003 | Sandhu et al. |
| 2003/0061148 A1 | 3/2003 | Alavian |
| 2003/0069830 A1 | 4/2003 | Morano |
| 2003/0069836 A1 | 4/2003 | Penney et al. |
| 2003/0074167 A1 | 4/2003 | Browne et al. |
| 2003/0083978 A1 | 5/2003 | Brouwer |
| 2003/0093351 A1 | 5/2003 | Sarabanchong |
| 2003/0093360 A1 | 5/2003 | May |
| 2003/0097328 A1 | 5/2003 | Lundberg et al. |
| 2003/0101125 A1 | 5/2003 | McGill et al. |
| 2003/0115128 A1 | 6/2003 | Lange et al. |
| 2003/0195822 A1 | 10/2003 | Tatge et al. |
| 2003/0216932 A1 | 11/2003 | Foley |
| 2003/0220865 A1 | 11/2003 | Lutnick |
| 2003/0220868 A1 | 11/2003 | May |
| 2003/0225672 A1 | 12/2003 | Hughes, Jr. et al. |
| 2003/0225673 A1 | 12/2003 | Hughes, Jr. et al. |
| 2003/0225674 A1 | 12/2003 | Hughes, Jr. et al. |
| 2003/0225857 A1 | 12/2003 | Flynn et al. |
| 2003/0236737 A1 | 12/2003 | Kemp et al. |
| 2004/0042506 A1 | 3/2004 | Fallon et al. |
| 2004/0044613 A1 | 3/2004 | Murakami et al. |
| 2004/0059666 A1 | 3/2004 | Waelbroeck et al. |
| 2004/0088242 A1 | 5/2004 | Ascher et al. |
| 2004/0107123 A1 | 6/2004 | Haffner et al. |
| 2004/0111358 A1 | 6/2004 | Lange et al. |
| 2004/0143538 A1 | 7/2004 | Korhammer et al. |
| 2004/0172355 A1 | 9/2004 | Pandher |
| 2004/0199455 A1 | 10/2004 | Saliba |
| 2004/0210511 A1 | 10/2004 | Waelbroeck et al. |
| 2004/0240486 A1 | 12/2004 | Venkatesh et al. |
| 2005/0096999 A1 | 5/2005 | Newell et al. |
| 2005/0149428 A1 | 7/2005 | Gooch et al. |
| 2005/0154660 A1 | 7/2005 | Sturm et al. |
| 2005/0160024 A1 | 7/2005 | Soderborg et al. |
| 2005/0171889 A1 | 8/2005 | Daley et al. |
| 2005/0171890 A1 | 8/2005 | Daley et al. |
| 2005/0228735 A1 | 10/2005 | Duquette |
| 2006/0015448 A1 | 1/2006 | Burkhardt et al. |
| 2006/0036448 A1 | 2/2006 | Haynie et al. |
| 2006/0036531 A1 | 2/2006 | Jackson et al. |
| 2006/0069635 A1 | 3/2006 | Ram et al. |
| 2006/0095360 A1 | 5/2006 | Apple et al. |

(56) References Cited

U.S. PATENT DOCUMENTS

| | | | |
|---|---|---|---|
| 2006/0106707 A1 | 5/2006 | Shetty et al. | |
| 2006/0106708 A1 | 5/2006 | Abushaban et al. | |
| 2006/0184447 A1 | 8/2006 | Nieboer et al. | |
| 2007/0043939 A1 | 2/2007 | Fallon et al. | |
| 2007/0050514 A1 | 3/2007 | Fallon | |
| 2007/0050515 A1 | 3/2007 | Fallon | |
| 2007/0067483 A1 | 3/2007 | Fallon | |
| 2007/0083746 A1 | 4/2007 | Fallon et al. | |
| 2007/0100732 A1 | 5/2007 | Ibbotson et al. | |
| 2007/0118460 A1 | 5/2007 | Bauerschmidt et al. | |
| 2007/0174209 A1 | 7/2007 | Fallon et al. | |
| 2008/0010183 A1 | 1/2008 | Holmes et al. | |
| 2008/0091586 A1 | 4/2008 | Cottrell | |
| 2008/0126853 A1 | 5/2008 | Callaway et al. | |
| 2008/0232457 A1 | 9/2008 | Fallon et al. | |
| 2009/0012892 A1 | 1/2009 | Biase | |
| 2009/0076940 A1 | 3/2009 | Patel et al. | |
| 2009/0154545 A1 | 6/2009 | Fallon et al. | |
| 2009/0182683 A1 | 7/2009 | Taylor et al. | |
| 2009/0287628 A1 | 11/2009 | Indeck et al. | |
| 2010/0023458 A1 | 1/2010 | Kociuba | |
| 2010/0088212 A1* | 4/2010 | Czupek | G06Q 40/04 705/37 |
| 2010/0153254 A1 | 6/2010 | Shalen | |
| 2010/0241758 A1 | 9/2010 | Oddie et al. | |
| 2011/0145447 A1 | 6/2011 | Dimond | |
| 2011/0178911 A1 | 7/2011 | Parsons et al. | |
| 2011/0178912 A1 | 7/2011 | Parsons et al. | |
| 2011/0178917 A1 | 7/2011 | Parsons et al. | |
| 2011/0178918 A1 | 7/2011 | Parsons et al. | |
| 2011/0178919 A1 | 7/2011 | Parsons et al. | |
| 2011/0178957 A1 | 7/2011 | Parsons et al. | |
| 2011/0179050 A1 | 7/2011 | Parsons et al. | |
| 2011/0184844 A1 | 7/2011 | Parsons et al. | |
| 2011/0246351 A1 | 10/2011 | Sulavka | |
| 2011/0264578 A1 | 10/2011 | Chapman et al. | |
| 2011/0320335 A1 | 12/2011 | Gorelik et al. | |
| 2012/0047062 A1 | 2/2012 | Robinson | |
| 2012/0089496 A1 | 4/2012 | Taylor et al. | |
| 2012/0089497 A1 | 4/2012 | Taylor et al. | |
| 2012/0095893 A1 | 4/2012 | Taylor et al. | |
| 2012/0246052 A1 | 9/2012 | Taylor et al. | |
| 2012/0259757 A1 | 10/2012 | Nager | |
| 2012/0290460 A1 | 11/2012 | Curry, Jr. et al. | |
| 2013/0030963 A1 | 1/2013 | Cramer et al. | |
| 2013/0031025 A1 | 1/2013 | Gibbs | |
| 2013/0226764 A1 | 8/2013 | Battyani | |
| 2014/0006243 A1 | 1/2014 | Boudreault et al. | |
| 2014/0143121 A1 | 5/2014 | Stevens | |
| 2014/0279342 A1 | 9/2014 | Maynard | |
| 2014/0289094 A1 | 9/2014 | Gaber et al. | |
| 2015/0127516 A1 | 5/2015 | Studnitzer et al. | |

FOREIGN PATENT DOCUMENTS

| | | |
|---|---|---|
| JP | 2002-183450 | 6/2002 |
| JP | 2002-366880 | 12/2002 |
| WO | 03/034297 A1 | 4/2003 |
| WO | 2004/008274 A2 | 1/2004 |
| WO | 2008/154306 | 12/2008 |
| WO | 2011/134975 | 11/2011 |
| WO | 2012/079041 | 6/2012 |

OTHER PUBLICATIONS

"Asynchronous Array of Simple Processors", Wikipedia, Feb. 5, 2009, 4 pages, http://web.archive.org/web/20090205100510/http://en.wikipedia.org/wiki/Asynchronous_array_of_simple_processors.

"Functional Definition of Liffe Connect", Atos Euronext Market Solutions, 2005, Version 9, Issued Version 10.0, 2 pages.

"High Performance Trading—Deployment of Leading Edge Technology Thinking", Argon Design, 2013, 2 pages.

"Impact Cost", National Stock Exchange of India Ltd., Sep. 25, 2011, 2 pages, http://web.archive.org/web/20110925011346/http://nseindia.com/products/content/equities/indices/impact_cost.htm.

"Message Encoding/Decoding Using Templated Parameters," Arun K. Nanda et al., patent application 40 pages, available as early as Apr. 19, 2016.

"NYFIX, Inc. Routes OTC Orders to American Stock Exchange", Silicon Valley Biz Ink, Dec. 5, 2003, 2 pages.

"onExchange Selects Exodus to Host Online Derivatives Exchange; Leading Online Derivatives Exchange Optimizes Network Performance by Selecting Leader in Complex Internet Hosting", Business Wire, Nov. 7, 2000, 3 pages.

"Real-time Operating System", Wikipedia, Retrieved May 19, 2013, http://en.wikipedia.org/wiki/Real-time_operating_System, 6 pages.

"Solace Message Routers and Cisco Ethernet Switches: Unified Infrastructure for Financial Services Middleware", White Paper, 2010, 15 pages, Cisco Systems, Inc.

"What is a Real-Time Operating System (RTOS)?", National Instruments, Oct. 2, 2012, 2 pages.

Barron's, Nov. 4, 1991, "Derivatives Drive New Network", Barron's, 71, 44, ABI/INFORM Global, pp. 36-37.

Benjamin Geib, "Investigating Low Latency Trading with an HT Enabled FPGA", Universitat Heidelberg, Aug. 2, 2011, 17 pages.

C. Leber et al., "High Frequency Trading Acceleration Using FPGAs", International Conference on Field Programmable Logic and Applications, 2011, 317-322.

Chacko et al., "Pricing Interest Rate Derivatives: A General Approach", The Review of Financial Studies, Mar. 2002, pp. 195-241, vol. 15, No. 1.

Chicago Board of Trade, "How the e-cbot® Market Works", 2003, 29 pages.

Cisco Systems, Inc., "Design Best Practices for Latency Optimization", 1992-2007, 8 pages.

Corvil, "Nanosecond Latency Management", Whitepaper, 2011, 10 pages.

Ding-Ming Kwai et al., "Fault-Tolerant Processor Arrays Using Space and Time Redundancy", ICAPP 1996, pp. 303-310.

Domowitz, Ian, 1995, "Electronic Derivatives Exchanges: Implicit Mergers, Network Externalities, and Standardization", The Quarterly Review of Economics and Finance, vol. 35, No. 2, Summer, 1995, pp. 163-175.

English translation of Japanese Office Action in JP 2006-538545, dated Jul. 6, 2010, 3 pages.

Examiner's Report in CA 2,544,856 dated Nov. 26, 2012, 5 pages.

Examiner's Report in CA2885377 dated May 13, 2015, 5 pages.

Financial News Online, May 29, 2000, "Creditex Widens Access", obtained at the internet address: http://www.efinancialnews.com/index.cfm ?. . . , Mar. 29, 2004, 1 page.

Fred R. Bleakley, "Firms Approach Hedges with Caution", Asian Wall Street Journal, Aug. 18, 1993, 4 pages.

Functional Definition of Liffe Connect for the Chicago Board of Trade, Liffe Connect Version 7.2, Issued Version 1.0, 2003.

Functional Definition of Liffe Connect, Liffe Connect Version 9.0, Issued Version 2.0 by Nick Bishop/Angela Edwards, 2005.

Functional Definition of Liffee Connect for the Chicago Board of Trade, Liffe Connect Version 7.1 CBOT, Issued Version 2.6, Dec. 2003.

Guardian Unlimited, The Guardian, Apr. 11, 2000, "Banks plan trading network for $52 trillion derivatives", obtained at the internet address: http://www.guardian.co.uk/business/story/0,3604,178019,00.html, Mar. 18, 2004, 2 pages.

International Search Report and Written Opinion in PCT Application No. PCT/US08/03538 dated Jun. 12, 2008, 9 pages.

International Search Report and Written Opinion, from PCT Application No. PCT/US2016/056342, dated Nov. 25, 2016, WO.

International Search Report and Written Opinion, from PCT/US2014/064001, dated Feb. 13, 2015, WO.

International Search Report from PCT/US04/37238 dated Jun. 13, 2008.

International Search Report in International Patent Application No. PCT/AU2009/000849, dated Aug. 6, 2009, 4 pages.

International Search Report in International Patent Application No. PCT/EP2011/056611, dated Jan. 20, 2012, 3 pages.

(56) References Cited

OTHER PUBLICATIONS

Introduction to the International Securities Exchange, International Securities Exchange, pp. 1-12, 1999.
J. Downes et al., Dictionary of Finance and Investment Terms, Barrons Educational Services, 1998, pp. 27-28.
Larry L. Peterson et al., "Computer Networks, A System Approach", ISBN 1-55860-368-9, 1996, 25 pages.
Leber et al., "How to Get World's Best Possible Ultra Low Latency in High Frequency Trading (Tick to Trade Method)", 2012.
Lockwood, et al., "A Low-Latency Library in FPGA Hardware for High-Frequency Trading (HFT)", 2012 IEEE 20th Annual Symposium on High-Performance Interconnects, 2012, pp. 9-16.
low-latency.com, "Groundbreaking Results for High Performance Trading with FPGA and x86 Technologies", Newswire, Sep. 25, 2013, 2 pages.
Network Magazine India, "BSE The Stock Exchange, Mumbai—Network Diagram", obtained at the internet address: http://www.networkmagazineindia.com/200302/20030206bse.jpg, Dec. 5, 2003, 1 page.
Network Magazine India, "Case Study: BSE implements intelligent switching architecture—Combining networks Intelligently", http://www.expresscomputeronline.com/cgi-bin/ecprint/MasterPFP.cgi?doc=, Dec. 5, 2003, 3 pages.
Office Action in Canadian Application 2,544,856 dated May 23, 2012, 4 pages.
Office Action in Canadian Application No. 2,544,856 dated Sep. 10, 2013, 8 pages.
Office Action in EP04810547.2 dated Sep. 13, 2010, 6 pages.
Orc Software, "Chicago Board of Trade certifies Orc Software for its electronic trading platform", obtained at the internet address: http://www.orcsoftware.com/Company/PNR/PNR_031106_e-cbot_eng.htm, Dec. 5, 2003, 2 pages.
Orc Software, "ExNet Network", obtained at the internet address: http://www.orcsoftware.com/Products/ExNetPIPNetwork.htm, Dec. 5, 2003, 1 page.
Orc Software, "Orc Futures", obtained at the internet address: http://www.orcsoftware.com/Products/OrcFutures.htm, Dec. 5, 2003, 1 page.
Orc Software, "Orc Liquidator", obtained at the internet address: http://www.orcsoftware.com/Products/OrcLiquidator.htm, Dec. 5, 2003, 1 page.
Orc Software, "Orc Technology", obtained at the internet address: http://www.orcsoftware.com/Technology/index.htm, Dec. 5, 2003, 2 pages.
Ostrovsky, "Working towards a seamless link: Global Protocol by Arkady Ostrovsky", Financial Times, London, Jun. 28, 2000, p. 4.
Peter Lee, "Industry Standard Sought for Valuing Options", Euromoney, May 1993, 2 pages.
Renee Robbins, "Advantages of FPGAs", Control Engineering, Feb. 1, 2010, 5 pages.
Risca et al., "Trading Floor Architecture", Cisco Systems, 2008, 36 pages.
Scott Caudell, "Co-location, Performance Management and Technology Innovation for Ultra-low Latency Trading", High Performance Technologies for Trading, Apr. 2010, 5 pages, Issue 5.
Senior, Adriana, Jun. 11, 1999, "Morgan Buying Into Network for On-Line Security Trades", American Banker, New York, NY, Jun. 11, 1999, vol. 164, Iss. 111; p. 1.
Stanley Kucemba et al., "Active and Passive Foreign Exchange Risk Management: A Primer", TMA Journal, Nov./Dec. 1996, 5 pp. 16, 6.
Sungard, "InTrader—The integrated, real-time solution for bank treasury and portfolio management", Sungard Securities Processing publication, 2003, 2 pages.
Sungard, "Panorama EQN", obtained at the internet address: http://www.sungard.com/products_and_services/stars/panorama/solutions/panoramaotcdistribution.htm, Dec. 5, 2003, 2 pages.
Sungard, "Single Integrated Architecture", obtained at the internet address: http://www.sungard.com/products_and_services/stars/panorama/solutions/panoramatechnologyandinfrastr . . . , Dec. 5, 2003, 3 pages.
Sungard, "Trading and Decision Support", obtained at the internet address: http://www.sungard.com/products_and_services/stars/panorama/solutions/panoramatrading.htm, Dec. 5, 2003, 5 pages.
Swapswire, Press Releases, Apr. 10, 2000, "Leading derivative dealers announce SwapsWire—a pioneering interest rate derivatives electronic dealing network", http://www.swapswire.com/press/10_04_00.asp, Mar. 18, 2004, 2 pages.
Trading Technologies International, Inc., "X_Trader Platform", obtained at the internet address: http://www.tradingtechnologies.com/blue_xtrader.html, Mar. 18, 2004, 3 pages.
Trading Technologies International, Inc., "X_Trader TT Net", obtained at the internet address: http://www.tradingtechnologies.com/blue_net.html, Dec. 5, 2003, 1 page.
Tse et al., "High Frequency Trading—Measurement, Detection and Response", Trading Strategy, Dec. 6, 2012, 12 pages.
Tse et al., "High Frequency Trading—The Good, The Bad, and The Regulation", Trading Strategy, Dec. 5, 2012, 7 pages.
Wall Street & Technology Online, Dec. 4, 2003, "Electronic-Trading Newsflashes", obtained at the internet address: http://www.wstonline.com/printableArticle/;jsessionid=NA3QPNTTNKCOIQSNDBCCK . . . , Dec. 5, 2003, 2 pages.
Wall Street & Technology Online, Sep. 11, 2003, "Electronic Trading Newsflashes", obtained at the internet address: http://www.wstonline.com/printableArticle/;jsessionid=ILJHDTNYRJNVMQSNDBCCKHY?doc_id=14 . . . , Dec. 5, 2003, 1 page.
Wikipedia, "Real-time Business Intelligence", Retrieved May 19, 2013, 4 pages, http://en.wikipedia.org/wiki/Real-time_business_intelligence.

\* cited by examiner

CENTRAL LIMIT ORDER BOOK AUTOMATIC TRIANGULATION SYSTEM

RELATED APPLICATIONS

This application claims priority to and the benefit as a continuation under 37 C.F.R. 1.53(b) of U.S. patent application Ser. No. 15/135,112, filed Apr. 21, 2016, now U.S. Pat. No. 11,288,739, which claims the benefit of the filing date under 35 U.S.C. § 119(e) of Provisional U.S. Patent Application Ser. No. 62/240,280, filed on Oct. 12, 2015, which are hereby incorporated by reference in their entirety.

BACKGROUND

A financial instrument trading system, such as a futures exchange, referred to herein also as an "Exchange", such as the Chicago Mercantile Exchange Inc. (CME), provides a contract market where financial products/instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time, referred to as the expiration date or expiration month. An option is the right, but not the obligation, to sell or buy the underlying instrument (in this case, a futures contract) at a specified price within a specified time. The commodity to be delivered in fulfillment of the contract, or alternatively, the commodity, or other instrument/asset, for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the party's effect final settlement when the contract expires by paying/receiving the loss/gain related to the contract in cash, rather than by effecting physical sale and purchase of the underlying reference commodity at a price determined by the futures contract price.

Typically, the Exchange provides for a centralized "clearing house" through which all trades made must be confirmed, matched, and settled each day until offset or delivered. The clearing house is an adjunct to the Exchange, and may be an operating division thereof, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow customers to submit orders and receive confirmations, market data, and other information electronically via a network. These "electronic" marketplaces have largely supplanted the pit based trading systems whereby the traders, or their representatives, all physically stand in a designated location, i.e. a trading pit, and trade with each other via oral and hand based communication. In contrast to the pit based trading system where like-minded buyers and sellers can readily find each other to trade, electronic marketplaces must electronically "match" the orders placed by buyers and sellers on behalf thereof. Electronic trading systems may offer a more efficient and transparent system of trading. Electronic trading systems may achieve more fair and equitable matching among traders as well as identify more opportunities to trade, thereby improving market liquidity.

Customers such as market makers may place hundreds to thousands of orders with the Exchange covering multiple strikes for an instrument. These orders are generated by the customer, using data models which are based on market data, and transmitted to the exchange quoting premiums. When the market changes, some or all of these orders may need to be recalculated and updated, typically all at once or in as little time as possible, by, for example, sending in order modifications or cancellations to the exchange. The flood of information is taxing on the exchange hardware and also on customer's equipment as it may involve thousands to millions of message per second back and forth throughout a day.

DETAILED DESCRIPTION

Figure 1:
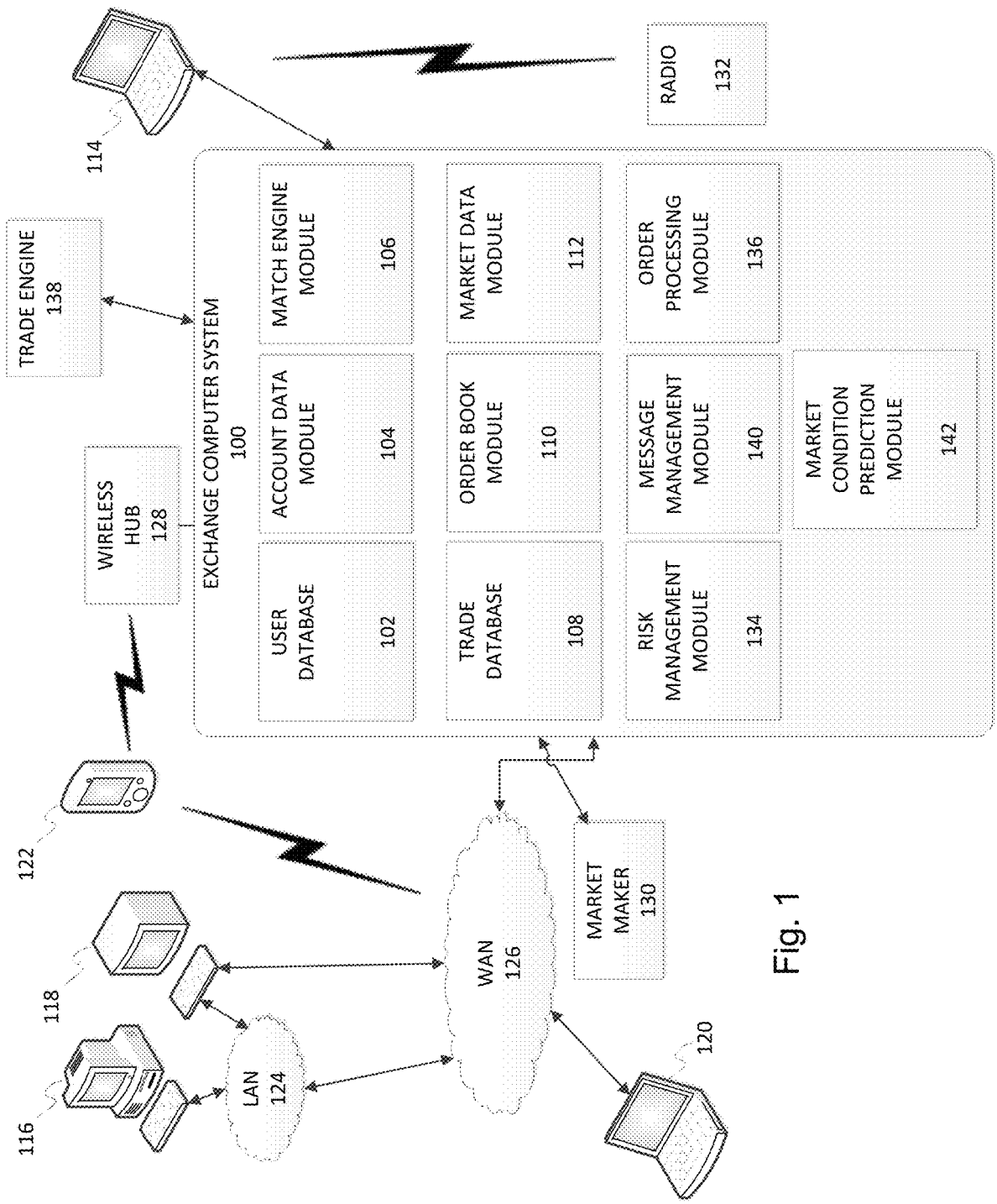
FIG. 1 depicts an illustrative computer network system that may be used to implement aspects of the disclosed embodiments.

The disclosed embodiments allow for market participants to quote an order for an options contract in implied volatility, as opposed to quoting by premium, and have the order implied into both the futures market and the premium quoted options market. In existing systems, quotes may be received separately for each book and matched separately. Drawbacks in existing systems include massive communication bursts that degrade performance both on the exchange and customer sides, a lack of liquidity in certain markets, and the inability to satisfy mitigation possibilities. Triangulation solves these issues by moving part of the modeling to the exchange side, providing built-in mitigation, and increasing liquidity between the different books.

The disclosed embodiments relate to systems and methods which match or otherwise allocate an incoming order to trade with "resting," i.e. previously received but not yet matched (fully satisfied), orders. In particular, the disclosed embodiments relate to triangulation between futures, premium option, and volatility order books allowing incoming orders to trade across all three books. Triangulation allows for orders to quickly and efficiently imply between the books increasing market liquidity. The disclosed embodiments further relate to storing a customer's model and using the model to update the order books based on the movement of the futures market; using the model saves time, communication bandwidth, and computing power. Triangulation further provides automatic mitigation for volatility priced orders through automatic implication in the futures market.

A central limit order book (CLOB) may be a specialized order book that that matches customer orders (e.g. bids and offers). A CLOB may maintain a stack (ala resting orders) in that a customer can see multiple orders for and pricing for each product. Certain embodiments triangulate three such CLOB's—a futures CLOB (FUT CLOB), a premium quoted options CLOB (PQO CLOB), and a volatility quoted options CLOB (VQO CLOB). For each instrument offered by the exchange, there may exist these CLOB's (among others). In existing systems, each CLOB may be managed individually. A customer may place an order in the PQO CLOB or the VQO CLOB, or both etc. Each of the books are matched by a matching engine separately. In certain cases, an order may implied (synthetically copied and injected) from one CLOB to another related CLOB.

Different CLOB's may be related in that the underlying products are related, but the presentation, pricing, and/or satisfaction may be different. For example, a product may be quoted using different pricing models or schemes. A customer may prefer to evaluate (and quote) an instrument using different mechanisms or models. Two popular quoting mechanisms are premiums and volatility. When quoted, an order may be matched against it respective book either PQO CLOB (Premiums) or VQO CLOB (Volatility).

The PQO CLOB represents orders that are quoted in premiums. A premium may be the price paid to acquire the option. Premiums may also be referred to as the option price. Option prices are considered premiums because the options themselves have no underlying value. The components of an option premium include its intrinsic value, its time value and the implied volatility of the underlying asset. As the option nears its expiration date, the time value may edge closer and closer to $0, while the intrinsic value may closely represent the difference between the underlying instrument's price and the strike price of the contract. The strike price may be defined as the price at which the holder of an options can buy (in the case of a call option) or sell (in the case of a put option) the underlying product when the option may be exercised. The strike price may also be referred to as the exercise price.

The VQO CLOB represents orders that are quoted in implied volatility. Volatility may be a statistical measurement of the degree of fluctuation of a market or security. Implied volatility may be the volatility as implied by the market price of the option. The implied volatility may be calculated using an option pricing model, such as the Black model, in which a mathematical relationship between the volatility of the underlying security and the price of its options has been established. Options on equities/cash may use a standard or custom model. Implied volatility may be the market's opinion of the volatility of the option's underlying security. The volatility of an option refers to how volatile the price was/is expected to be. Using volatility, the price of the underlying security, the market price of the option, the strike price of the option, the expiration date of the option, the interest rate, if applicable, and the dividend yield, if applicable, the premium price may be determine Implied volatility and premiums are related through use of options pricing models. For example, using a pricing model, the implied volatility of an option may be backed out of the price of the option. Models such as Black, Black-Scholes, Whaley, Bjerksund, Merton, or customized models allow a trader or exchange to use implied volatility to evaluate an options price or vice versa. Each customer, however, may use a different model to calculate volatility.

The Black model is a standard model used for evaluating European options; Whaley is a standard model for US based options; options on equities/cash may use the standard Black-Scholes model. Black is used to calculate a theoretical call price (ignoring dividends paid during the life of the option) using the five key determinants of an option's price: underlying price, strike price, volatility, time to expiration, and short-term (risk free) interest rate. The original formula for calculating the theoretical option price (OP) is as follows:

$$OP = SD(d_1) - Xe^{-rt}N(d_2) \quad \text{Equation 1}$$

Where:

$$d_1 = \frac{\ln\left(\frac{S}{X}\right) + \left(r + \frac{v^2}{2}\right)t}{v\sqrt{t}} \quad \text{Equation 2}$$

$$d_2 = d_1 - v\sqrt{t} \quad \text{Equation 3}$$

The variables are: S=price, X=strike, t=time remaining until expiration, expressed as a percent of a year, r=current continuously compounded risk-free interest rate, v=volatility, ln=natural logarithm, N(x)=standard normal cumulative distribution function, and e=the exponential function.

The options pricing model may be solved for each variable. For example, a trader may start knowing the other variables and inputting a volatility to compute the premium. Likewise, the variables of an options pricing model may be known (time to expiration, strike, price, interest rates) except for the volatility that the option is pricing in. Volatility may be backed out to understand the relative value of the option's price. As such, volatility is a particularly preferred method for quoting options. A customer may calculate volatility using a proprietary equation and then submit an order quoting the implied volatility. This has many benefits, a key one being that since volatility is a measure of change over time, small movements in the market do not effect it as much as premiums.

One of the downsides of using premium quoted options may be that as the FUT prices changes, the modeled option price OP may also change frequently. Premiums are directly related to the FUT price (see Black model above). Each time the FUT price ticks up or down (this happens constantly), the premiums may be adjusted ever so slightly. Customers that re-calculate their quotes as the FUT price moves may have to adjust each order. For single orders this may not be a major issue as an exchange system may be setup to handle adjustments to orders. However, for every instrument, there may be 10, 100, or 1000s of strikes. A market maker may quote thousands of strike prices for each instrument. If and when the futures price ticks up or down, each and every single order would have to be recalculated and reentered (for each instrument, for each market maker). The volume of communications and messages may overload even a large pipeline. Implied volatility, however, changes less frequency than pricing. Large swings in the FUT price may affect volatility, but smaller ticks up and down may not. As such, quoting in volatility allows for fewer communications to be sent back and forth between traders and the exchange. An order may be quoted in volatility and be valid for a length of time even while the futures market changes.

Although volatility quoted orders offer may benefits, some customers may always prefer to quote in premiums. As such, it may be preferable to maintain an active premium quoted market. In order to maintain liquidity in the PQO market, orders that are quoted in volatility may be automatically implied from the VQO market to the PQO market when there is not a match in the VQO market. As mentioned above, small changes in the FUT market may adjust the option price. It may be taxing for the customer to continuously adjust their premium quotes. In certain embodiments, a customer may supply an options pricing model to the exchange. The exchange stores and runs the model locally as the FUT price changes. Instead of having the customer re-quote each order, the exchange may use the model to calculate the premiums. The exchange may then imply an order into the PQO CLOB based on this calculation. As the FUT price changes, the implied quotes may be constantly re-quoted. This may be another benefit of triangulation with the FUT market. Locking the Futures market when these orders are being calculated and re-quoted may allow for the exchange to recalculate the quotes without the underlying variables changing during the calculation. Additionally, because this may be done within the exchange environment, there may be less of need to receive and produce the massive amounts of communications that are present in existing systems.

Volatility quoted options are conventionally hedged. As with most transactions, volatility quoted orders carry risk. For example, for a naked call, the theoretical risk may be infinite. The customer may be responsible for the difference between the strike price and the amount the instrument moves above this price. Because there is not a limit to how high a price can trade, the potential loss may be infinite. In order to protect themselves, traders may generally always hedge orders by using an opposite-side-of-the-market futures trade. Together, the option and the future comprise a delta-neutral option-future combination. In existing systems, the futures order may be entered separately from the volatility quoted order. Certain embodiment including triangulation with the futures market allow the hedge transaction to proceed automatically. When an order is quoted in volatility, the order may also be implied into the futures market.

In certain embodiments, the system allows traders to place orders to trade options contracts by specifying those orders based on volatility or on price. The orders are trading against separate order books with separate match engines, for example a VQO book and a PQO book. Implication may be used between the VQO book and PQO book to provide liquidity. Hedging, via implication, into the underlying Futures order book may also be provided to automatically trade the requisite futures contracts to hedge a particular options trade.

When trading options contracts by volatility, a trader may provide their quoting model to the exchange. The exchange may normalize the model and store the model with alternative models from other traders. Once an initial order to trade a VQO is placed, the exchange automatically maintains/updates the order based on changes in the underlying futures market and the trader's stored quoting model. Where a trader has 1000's of orders, the automatically updating alleviates the trader from having to maintain each of the 1000's of orders, such as by sending in 1000's of order modifications/cancelations, etc., as the market changes. Instead, the Exchange takes care of the updating and maintenance. Once the VQO orders have been updated due to a market change, those updates, via implication, are carried into/reflected in the PQO and underlying futures markets.

While the disclosed embodiments may be discussed in relation to futures and/or options on futures trading, it may be appreciated that they may be applicable to any equity, options or futures trading system, e.g., exchange, Electronic Communication Network ("ECN"), Alternative Trading System ("ATS"), or Swap Execution Facility ("SEF"), or market now available or later developed, e.g. cash, Futures, etc., as well as any instrument traded thereon. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trade orders, cancellation, etc., in a manner as expected by the market participants, such as based on market data, e.g. prices, available counter-orders, etc., to provide an expected level of certainty that transactions may occur in a consistent and predictable manner and without unknown or unascertainable risks. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g. that transactional integrity and efficiency are maintained.

As was discussed above, electronic trading systems ideally attempt to offer an objective, efficient, fair and balanced market where market prices reflect a true consensus of the value of products traded among the market participants, where the intentional or unintentional influence of human interaction may be minimized if not eliminated, and where unfair or inequitable advantages with respect to information access are minimized if not eliminated. The current systems ideally attempt to increase liquidity, decrease message volume, and increase matching performance.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the Exchange may further define the matching algorithm, or rules, by which incoming orders will be matched/allocated to resting orders.

Some products on an exchange are traded in an open outcry environment where the exchange provides a location for buyers and sellers to meet and negotiate a price for a quantity of a product. Other products are traded on an electronic trading platform (e.g., an electronic exchange), also referred to herein as a trading platform, electronic trading system, trading host or Exchange Computer System, where market participants, e.g. traders, use software to send orders to the trading platform. The order identifies the product, the quantity of the product the trader wishes to trade, a price at which the trader wishes to trade the product, and a direction of the order (i.e., whether the order is a bid, i.e. an offer to buy, or an ask, i.e. an offer to sell). It will be appreciated that there may be other order types or messages that traders can send including requests to modify or cancel a previously submitted order.

In particular, electronic trading of financial instruments, such as futures contracts, may be conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled/completed) orders are maintained in one or more data structures or databases referred to as "order books," such orders being referred to as "resting," and made visible, i.e., their availability for trading is advertised, to the market participants through electronic notifications/broadcasts, referred to as market data feeds. An order book/data structure may be typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product. A CLOB (Central Limit Order Book) may be a type of transparent order book system that matches customer orders.

In the exemplary embodiments, all transactions for a particular market may be ultimately received at the electronic trading system via one or more points of entry, e.g. one or more communications interfaces, at which the disclosed embodiments apply determinism, which as described may be at the point where matching occurs, e.g. at each match engine (where there may be multiple match engines, each for a given product/market, or moved away from the point where matching occurs and closer to the point where the electronic trading system first becomes "aware" of the incoming transaction, such as the point where transaction messages, e.g. orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g. matching, of those transactions/orders as will be described. See U.S. patent application Ser. No. 14/074,675, filed on Nov. 7, 2013, published as U.S. Patent Application Publication No. 2015/0127516, entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE", incorporated by reference herein.

Upon receipt of an incoming order to trade in a particular financial instrument, whether for a single component financial instrument, e.g. a single futures contract, or for multiple component financial instruments, e.g. a combination contract such as a spread contract, a match engine, as will be described in detail below, will attempt to identify a previously received but unsatisfied order counter thereto, i.e. for the opposite transaction (buy or sell) in the same financial instrument at the same or better price (but not necessarily for the same quantity unless, for example, either order specifies a condition that it must be entirely filled or not at all). Previously received but unsatisfied orders, i.e. orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e. to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

As was described above, the financial instruments which are the subject of the orders to trade, may include one or more component financial instruments. While each financial instrument may have its own order book, i.e. market, in which it may be traded, in certain embodiments, each financial instrument, may be listed in alternative related order books. Accordingly, when an order for a financial instrument is received, it may be matched against a suitable counter order in its own order book or, possibly, against other suitable counter orders in the related order books. For example, an order for a volatility options quoted contract may be matched against another suitable order for that contract. However, it may also be matched against suitable separate counter orders for the premium quoted options or futures found in their respective CLOB's (both the premium quoted and the volatility quoted being related to another using a pricing model). This is referred to as "implication" where a given order for a financial instrument may be matched via a combination of suitable counter orders for instruments which share common, or otherwise interdependent, financial variables.

The order for a particular instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." There may be numerous different implied matches identified which would allow the incoming order to be at least partially matched and mechanisms may be provided to arbitrate among them, such as by picking the implied match comprising the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed to appear available to trade in order to solicit the desired orders from the market participants. There may be numerous implied opportunities, the submission thereof, would allow the incoming order to be at least partially matched.

In general, advertising implied opportunities will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

In certain embodiments, the exchange system uses implied matching and implied opportunities to triangulate between three CLOB's, e.g. VQO CLOB (Volatility), PQO CLOB (Premium), and FUT CLOB (Futures). The mechanisms of the implied matching are discussed below and illustrated by scenarios in Appendix A which is incorporated by reference herein in its entirety. In certain embodiments, a customer quotes VQO. The exchange system implies an order into the PQO CLOB and/or FUT CLOB, increasing both liquidity and providing a mechanism to mitigate risk. Alternative methods of implying orders are also contemplated. For example, the exchange system may create an implied calendar spread. The standard calendar spread (SP) consists of two instruments within the same product group having different maturity months. Buy (1) calendar means: Buy (1) front month leg and Sell (1) back month leg (+1:−1 ratio).

A futures calendar spread may be composed of a long or short position in the futures in one expiration cycle and a position with the opposite sign in a different expiration. Example: short one contract of February natural gas and buy one contract of April natural gas. The profit or loss to a futures calendar position depends on changes in the prices of the contracts, and because the two contracts are on the same underlying asset the profitability of the spread will depend more specifically on changes in the term structure of the futures curve. In this example, if the prices of both contracts decline, but the February contract declines more, the position will make a profit.

An options calendar spread may be composed of two contracts with the same underlying asset, the same right (call or put), the same strike price, and different expiration months. This sort of calendar spread is typically opened at the same time by buying one option and selling the other, e.g. by selling the at the money call in the first expiration cycle and buying the at the money call in the second expiration cycle. While a futures calendar is affected by changes in the prices of the futures contracts, an options calendar is affected not just by price changes but also by changes in implied volatility. In fact, a short calendar (sell the longer dated option and buy the nearer one) is one of the simpler ways to gain long volatility exposure using options.

Receiving a bid for the implied book may create multiple orders in the explicit books. In certain embodiments, the exchange system (and the match engine(s)) are configured to imply across more than three order books. As illustrated in the calendar spread scenarios, the exchange system may create implied books or imply across spreads.

Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

The Exchange Computer System, as will be described below, monitors incoming orders received thereby and attempts to identify, i.e., match or allocate, as will be described in more detail below, one or more previously received, but not yet matched, orders, i.e. limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e. a market order to buy or sell at a price for which there are currently no resting orders. In particular, if the incoming order is a bid, i.e. an offer to buy, then the identified order(s) will be an ask, i.e. an offer to sell, at a price that is identical to or higher than the bid price. Similarly, if the incoming order is an ask, i.e. an offer to sell, the identified order(s) will be a bid, i.e. an offer to buy, at a price that is identical to or lower than the offer price.

Upon identification (matching) of a contra order(s), a minimum of the quantities associated with the identified order and the incoming order is matched and that quantity of each of the identified and incoming orders become two halves of a matched trade that is sent to a clearinghouse. The Exchange Computer System considers each identified order in this manner until either all of the identified orders have been considered or all of the quantity associated with the incoming order has been matched, i.e. the order has been filled. If any quantity of the incoming order remains, an entry may be created in the order book database and information regarding the incoming order is recorded therein, i.e. a resting order is placed on the order book for the remaining quantity to await a subsequent incoming order counter thereto.

Volatility quoted orders are conventionally hedged. As with most transactions, volatility quoted orders carry risk. For example, for a naked call, the theoretical risk may be infinite. The customer may be responsible for the difference between the strike price and the amount the instrument moves above this price. Because there isn't a limit to how high a price can trade, the potential loss may be infinite. In order to protect themselves, orders are generally if not always hedged by using an opposite-side-of-the-market futures trade. Together, the option and the future comprise a delta-neutral option-future combination. In existing systems, the futures order may be made separately from the Volatility quoting order. A customer may have to anticipate the FUT CLOB in order to determine how to mitigate risk. This has multiple effects. The necessity that a second trade be made creates double the message volume as a single trade. The second order may be initiated by the customer, which means at least some latency in the time to calculate and transmit the order. The second order is also not guaranteed to match. Matching the second order in the futures market will necessarily depend on the current orders resting in the FUT CLOB and if they are sufficient to offer mitigation.

In certain embodiments, with triangulation, mitigation is handled automatically. When a VQO or PQO is matched, the match engine may also attempt to match an opposite-side-of-the-market futures trade. The match engine(s) has direct access to the FUT market and may be able to determine the availability of futures to mitigate the risk involved with the volatility or premium quoted orders. The match engine may be able to determine what size bid to fill by being able to determine the size of the available FUT market. A customer or trader may place orders much larger than possible in the past with the knowledge that the order will be automatically hedged.

Traders access the markets on a trading platform using trading software that receives and displays at least a portion of the order book for a market, i.e. at least a portion of the currently resting orders, enables a trader to provide parameters for an order for the product traded in the market, and transmits the order to the Exchange Computer System. The trading software typically includes a graphical user interface to display at least a price and quantity of some of the entries in the order book associated with the market. The number of entries of the order book displayed is generally preconfigured by the trading software, limited by the Exchange Computer System, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the Exchange Computer System identifies that an incoming market order may be filled by a combination of multiple resting orders, e.g. the resting order at the best price does only partially fills the incoming order, the Exchange Computer System may allocate the remaining quantity of the incoming, i.e. that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the Exchange for multiple financial products. Similarly, if the Exchange Computer System identifies multiple orders contra to the incoming limit order and that have an identical price which may be favorable to the price of the incoming order, i.e. the price is equal to or better, e.g. lower if the incoming order is a buy or higher if the incoming order is a sell, than the price of the incoming order, the Exchange Computer System may allocate the quantity of the incoming order among such identified orders in accordance with the matching algorithms as, for example, may be defined in the specification of the particular financial product or defined by the Exchange for multiple financial products.

In certain embodiments, the allocation or matching algorithms may take into consideration if the order is "real" (explicit) or implicit). As discussed below, these algorithms may include multiple strategies that may be presented transparently to the customers so that they may be aware of how the match engine operates. Since implied orders are synthetically created (and not received), they may not correspond to the FIFO strategy. In such a scenario, the implied orders may be treated as junior to the real orders. Alternatively, the match engine may treat the implied order as an extension of the original real order and give the implied order the same time priority. These scenarios and others are described below.

As was noted above, an Exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g. unknown position of an order in an order book. Typically, the Exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular Exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some Exchange Computer Systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some Exchange Computer Systems cap the quantity of an incoming order that is allocated to a standing order on the basis of a priority for certain markets. In addition, some Exchange Computer Systems may give a preference to orders submitted by a trader who is designated as a market maker for the product. Other Exchange Computer Systems may use other criteria to determine whether orders submitted by a particular trader are given a preference. Typically, when the Exchange Computer System allocates a quantity of an incoming order to a plurality of identified orders at the same price, the trading host allocates a quantity of the incoming order to any orders that have been given priority. The Exchange Computer System thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein.

Other examples of matching algorithms which may be defined for allocation of orders of a particular financial product include:

Price Explicit Time
Order Level Pro Rata
Order Level Priority Pro Rata
Preference Price Explicit Time
Preference Order Level Pro Rata
Preference Order Level Priority Pro Rata
Threshold Pro-Rata
Priority Threshold Pro-Rata
Preference Threshold Pro-Rata
Priority Preference Threshold Pro-Rata
Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first. Followed by
Any remaining explicit orders in timestamp sequence (First In, First Out—FIFO) next. Followed by
Implied order with oldest timestamp next. Followed by
Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.
2. Sort the list by order size, largest order size first. If equal order sizes, oldest timestamp first. This is the matching list.
3. Find the 'Matching order size, which is the total size of all the orders in the matching list.
4. Find the 'tradable volume', which is the smallest of the matching volume and the volume left to trade on the incoming order.
5. Allocate volume to each order in the matching list in turn, starting at the beginning of the list. If all the tradable volume gets used up, orders near the end of the list may not get allocation.
6. The amount of volume to allocate to each order is given by the formula: (Order volume/Matching volume)*Tradable volume The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.
2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.
6. The amount of volume to allocate to each order is given by the formula: (Order volume/Matching volume)*Tradable volume The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.
8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein.

One exemplary system for matching is described in U.S. patent application Ser. No. 13/534,499, filed on Jun. 27, 2012, entitled "MULTIPLE TRADE MATCHING ALGORITHMS," published as U.S. Patent Application Publication No. 2014/0006243 A1, incorporated by reference herein, discloses an adaptive match engine which draws upon different matching algorithms, e.g. the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g. a limited life product, in a non-preferential manner, maintaining fair order allocation while improving market liquidity, e.g., over the life of the product.

In one implementation, this trading system may evaluate market conditions on a daily basis and, based thereon, change the matching algorithm between daily trading sessions, i.e. when the market is closed, such that when the market reopens, a new trading algorithm is in effect for the particular product. As will be described, the disclosed embodiments may facilitate more frequent changes to the matching algorithms so as to dynamically adapt to changing market conditions, e.g. intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the Exchange.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) may not get their orders filled. It can be seen from the above descriptions of the matching/allocation algorithms that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader may be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they may receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, Exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata. The hybrid system discussed above switches between FIFO and pro rata based on a condition of the market.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A match engine module/match engine/match processor 106 may be a hardware matching processor which is part of a transaction processing system. A data transaction processing system in which data items are transacted by a hardware matching processor that matches electronic data transaction request messages for the same one of the data items based on multiple transaction parameters from different client computers over a data communication network. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A message management module 140 may be included to, among other things, receive, and extract orders from, electronic messages as is indicated with one or more aspects of the disclosed embodiments. A market condition prediction module 142 may be included to generate transaction processing system latency estimates, as discussed herein. It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, the market condition prediction module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for predicting and/or publishing a current response time or current match engine latency as described herein.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 2:
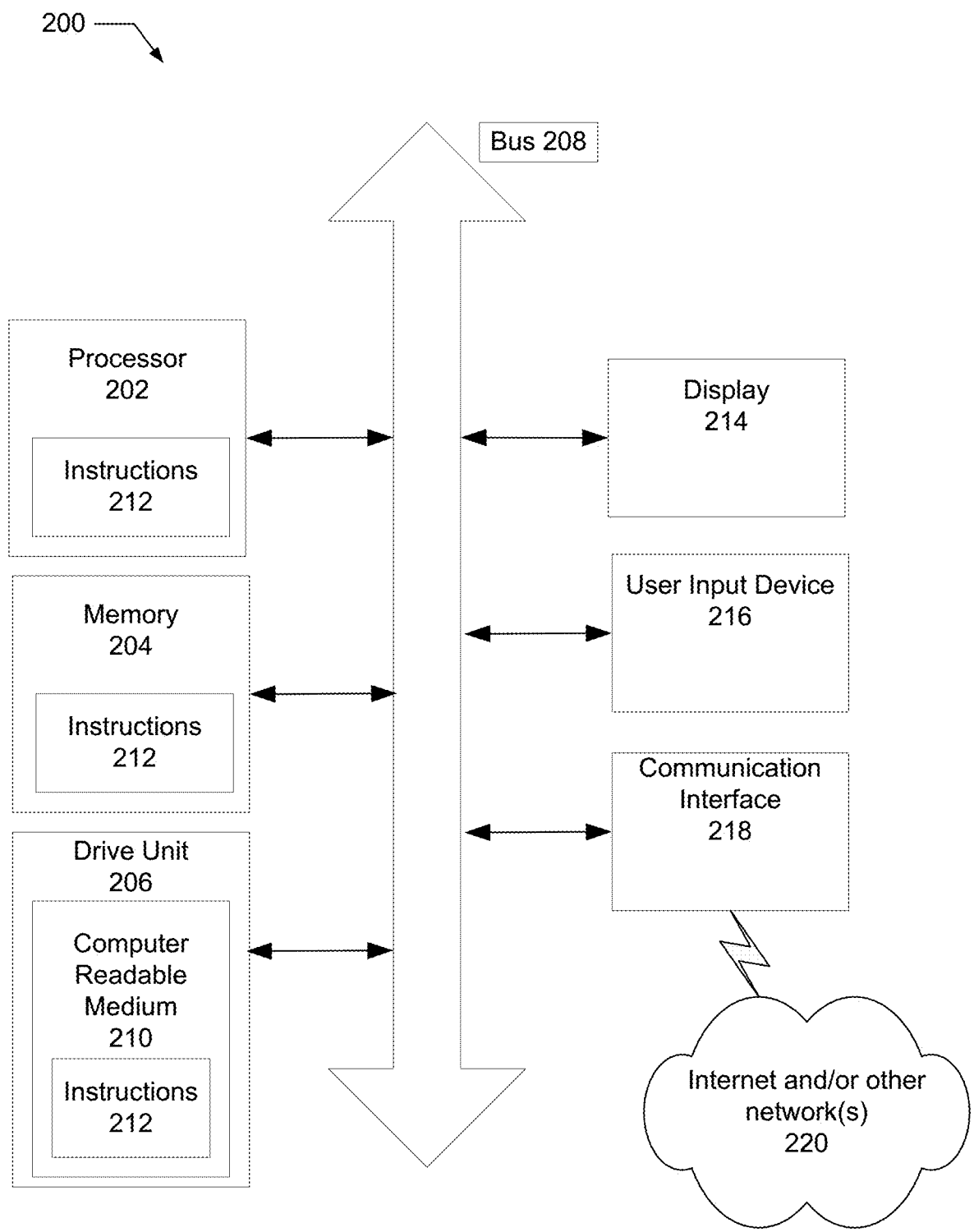
FIG. 2 depicts an illustrative embodiment of a general computer system for use with the disclosed embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 3:
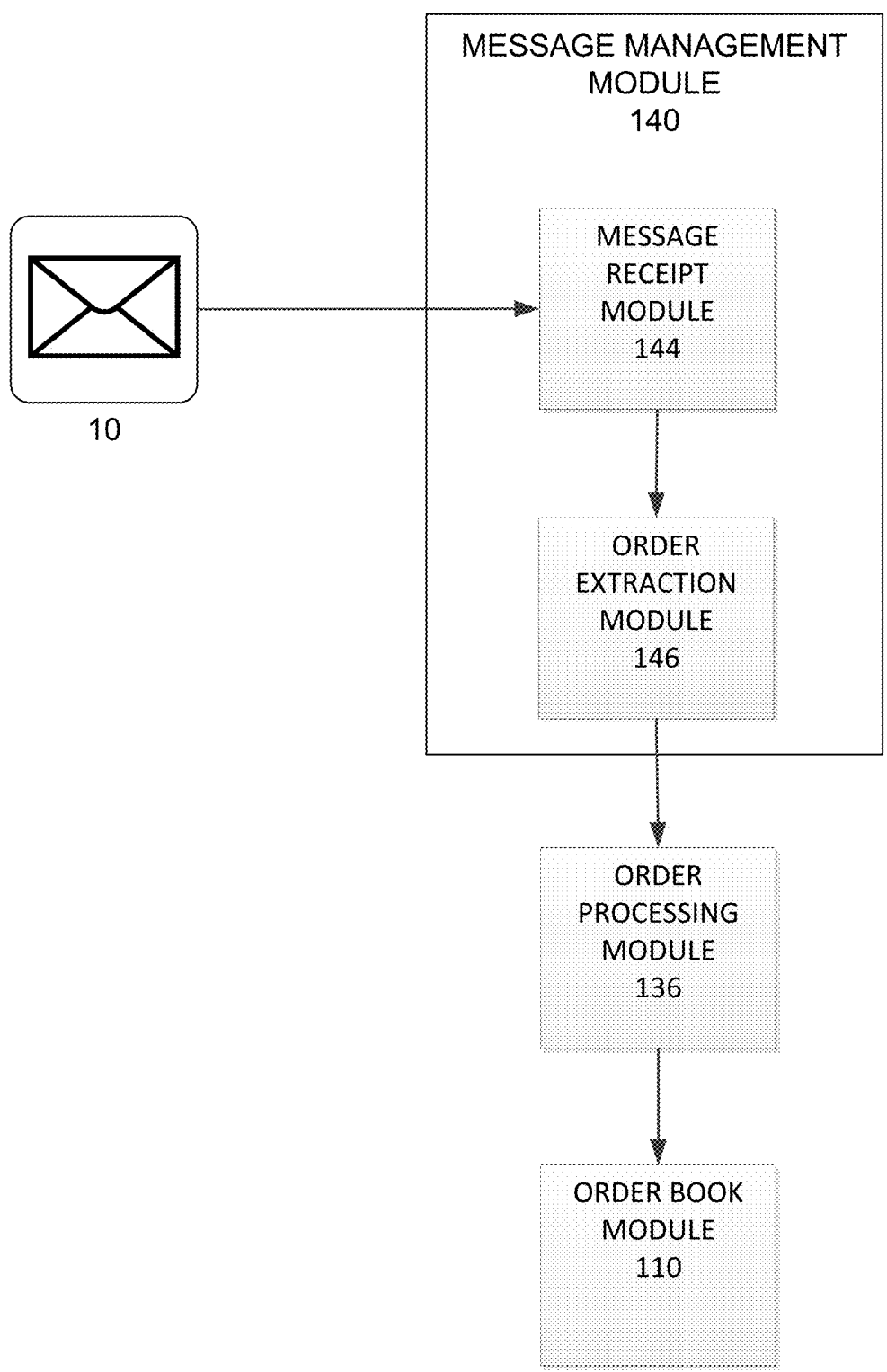
FIG. 3 depicts an example market order message management system for implementing the disclosed embodiments

FIG. 3 illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

Certain embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed message management system may be implemented using an open message standard implementation, such as FIX or FIX SBE (Simple Binary Encoding), or by an exchange-provided API.

In an embodiment, a plurality of electronic messages is received from the network. The plurality of electronic message packets may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other order counter thereto.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described above with respect to FIG. 2. Data may be stored relating received transactions for a period of time, indefinitely, or for a rolling most recent time period such that the stored data is indicative of the market participant's recent activity in the electronic market.

Figure 4:
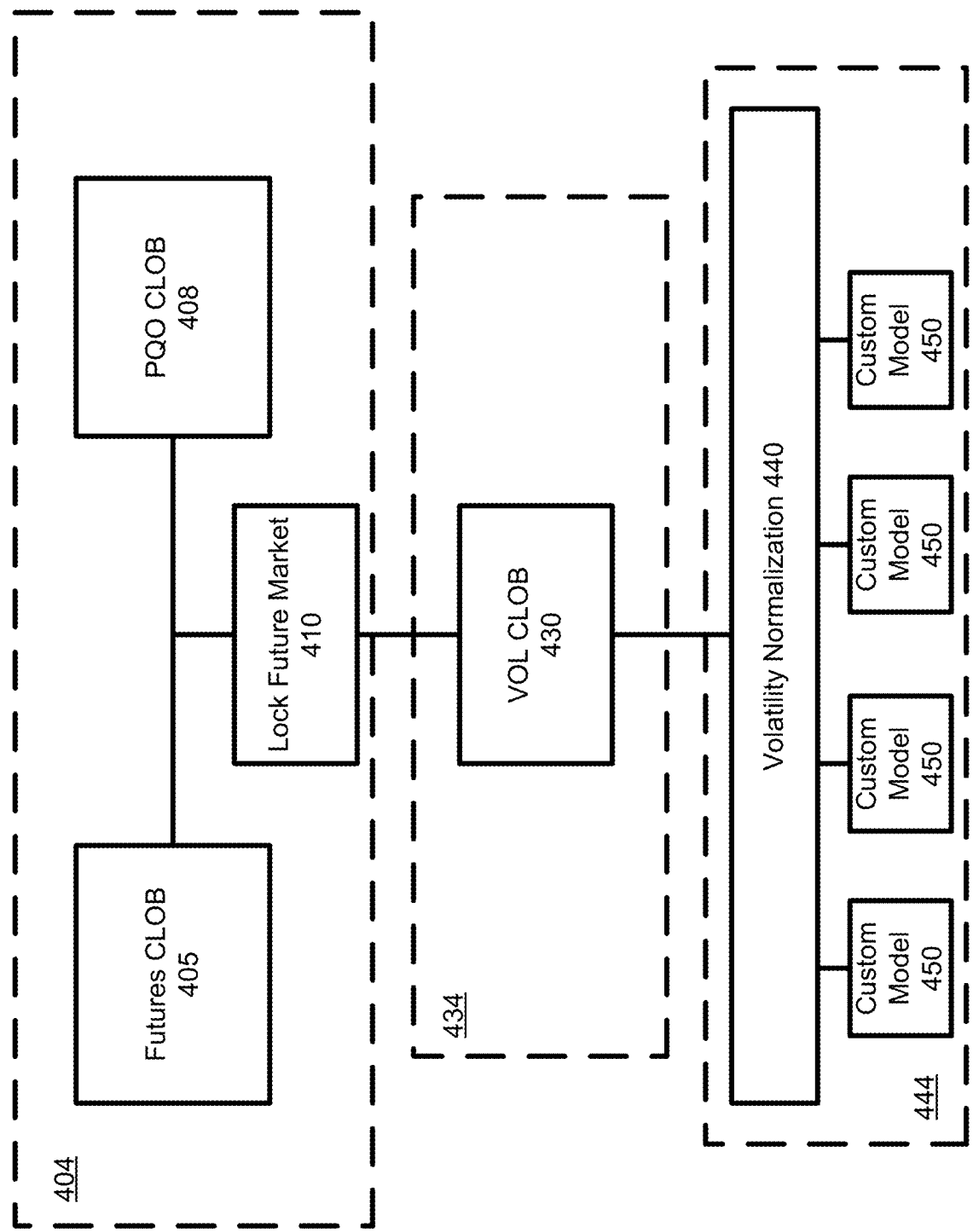
FIG. 4 depicts one embodiment of a system for triangulating options and futures.

FIG. 4 illustrates a block diagram of a conceptual system 400 for providing triangulation between a futures CLOB 405, a premium options CLOB 408, and a volatility CLOB 430 for incoming orders to trade a financial product, received via a network, such as the network 126 of FIG. 1, from a plurality of market participants. FIG. 4 includes three sections, the volatility quoting model execution section 444 where orders may be received and normalized; a real order section for volatility quoting 434; and an implication section 404 where orders are implied into the FUT CLOB 405 and PQO CLOB 408.

The volatility quoting model Execution 444 section may receive and normalize volatility quoted orders. Customer models may be received and stored in memory. When a volatility quoted order is received from a customer, the transaction message may indicate a specific model used by the customer. A normalization component 440 may then use a stored custom model 450 or table or database to normalize the Volatility to a standardized value that may be used to match orders from other customers that may be residing in the VQO CLOB 430. The Vol quoting model Execution section 444 may contain multiple models 450 for one or more customers.

The real order section for volatility quoting 434 is configured to operate as a normal matching engine. This section receives normalized volatility Quotes from the Vol quoting model Execution section 444 and attempts to match them with any resting orders that exist on the VQO CLOB 430. If the match engine identifies one or more suitable previously received but unsatisfied counter orders, they, and the normalized volatility quoted order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e. to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process.

The Implication section 404 may be where orders are implied into the FUT CLOB 405 and PQO CLOB 406. The futures market 410 may be locked prior to implication and may remained locked while orders are being implied. Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Figure 5:
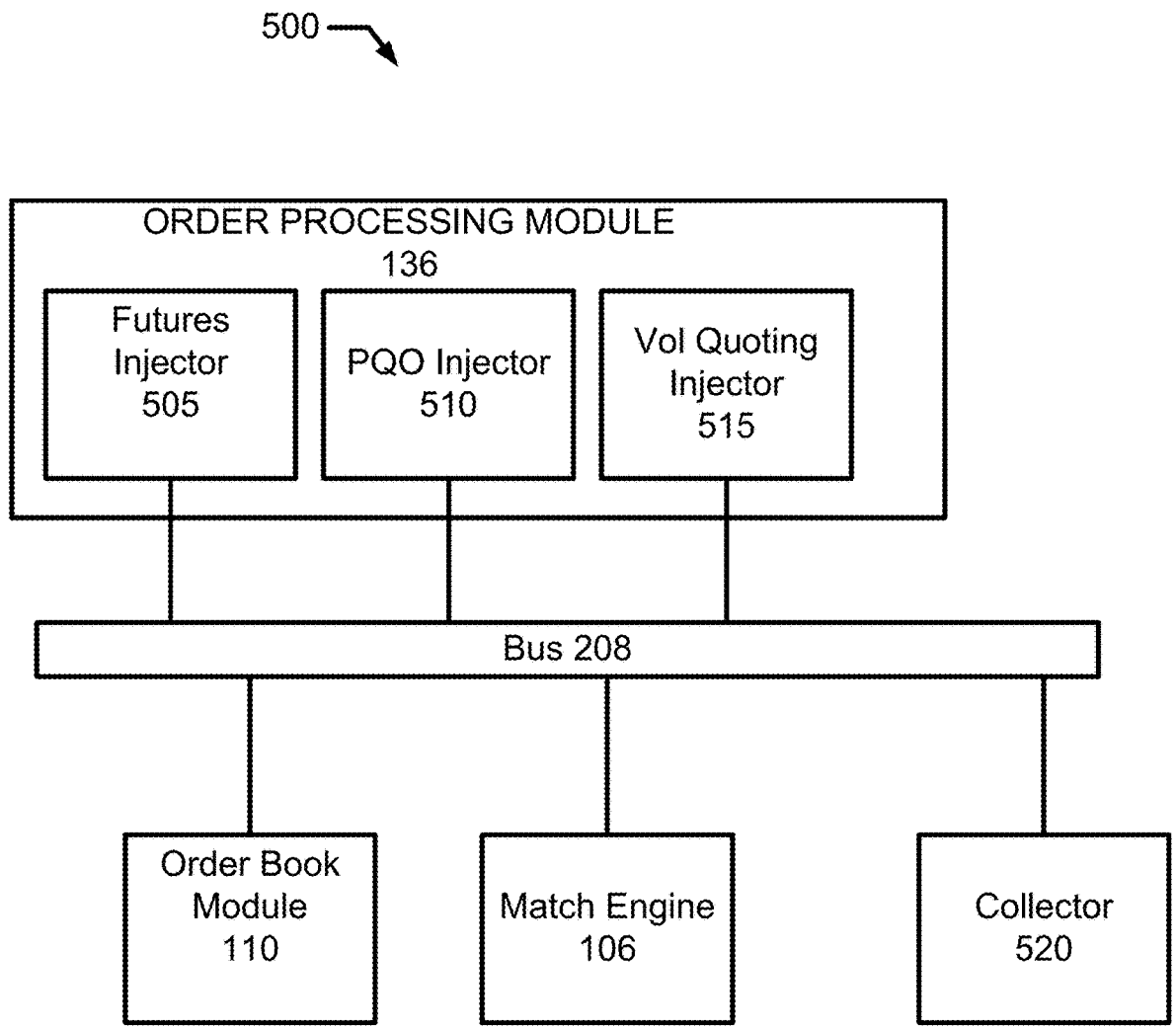
FIG. 5 depicts an example topology of a system for triangulating options and futures.

FIG. 5 depicts a block diagram of a system 500, that may also be referred to as an architecture, for providing triangulation between a futures CLOB, a premium options CLOB, and a volatility CLOB for incoming orders to trade a financial product, received via a network, such as the network 126 of FIG. 1, from a plurality of market participants. Wherein, as described, the system 500 comprising a match engine/match processor 106 that implements a market for an associated financial instrument by being operative to attempt to match an incoming order for a transaction for the associated financial instrument with at least one other previously received but unsatisfied order for a transaction counter thereto for the associated financial instrument, to at least partially satisfy one or both of the incoming order or the at least one other previously received order. A match engine/match processor may be a hardware matching processor that is part of a transaction processing system. A data transaction processing system in which data items are transacted by a hardware matching processor that matches electronic data transaction request messages for the same one of the data items based on multiple transaction parameters from different client computers over a data communication network. The match engine 106 may be connected to the connected into a switch 501 with either a single or dual physical connection. Single if both inbound (orders) and outbound (market data, acks, etc.) may be sent on the same wire. Dual if inbound (orders) and outbound (market data, acks, etc.) may be sent separately. The matching engine 106 may be responsible for performing the triangulation between future, premium and VQO CLOB's. The PQO injector, the Futures Injector, and the Vol Quoting Injector may reside on the same physical infrastructure or may be separate implementations.

The system 500 includes a Switch/Bus 208 that is connected to each of the other nodes. Communications between the components may be encoded either through source (.hpp, .h, .etc.) or via library.

The system 500 includes a futures injector 505, that may be implemented as a separate component or as one or more logic components, such as on an FPGA that may include a memory or reconfigurable component to store logic and processing component to execute the stored logic, or as computer program logic, stored in a memory 204, or other non-transitory computer readable medium, and executable by a processor 202, such as the processor 202 and memory 204 described below with respect to FIG. 4, to cause the processor 202 to, or otherwise be operative to, inject futures into the match engine 106. The Futures Injector may be a component that may be capable of injecting futures into the matching engine and/or order book module 110. The future injector 505 may use a specific messaging format and protocol via API (struct, library, etc.).

The system 500 includes a premium quoted options injector 510, that may be implemented as a separate component or as one or more logic components, such as on an FPGA that may include a memory or reconfigurable component to store logic and processing component to execute the stored logic, e.g. computer program logic, stored in a memory 204, or other non-transitory computer readable medium, and executable by a processor 202, such as the processor 202 and memory 404 described below with respect to FIG. 4, to cause the processor 202 to, or otherwise be operative to, inject options into the match engine 106. The premium options injector 510 may be a component that may be capable of injecting PQO into the matching engine and/or order book module 110. The premium options injector 510 may use a specific messaging format and protocol via API (struct, library, etc.).

The system 500 further includes an Vol Quoting Injector 515, that may be implemented as a separate component or as one or more logic components, such as on an FPGA that may include a memory or reconfigurable component to store logic and processing component to execute the stored logic, e.g. computer program logic, stored in a memory 204, or other non-transitory computer readable medium, and executable by a processor 202, such as the processor 202 and memory 204 described below with respect to FIG. 4, to cause the processor 202 to, or otherwise be operative to inject volatility quotes into the match engine 106 and/or order book module 110.

The system 500 further includes a Collector 520, coupled with the memory 204, the match engine 106, and that may be implemented as a separate component or as one or more logic components, such as on an FPGA that may include a memory or reconfigurable component to store logic and processing component to execute the stored logic e.g. computer program logic, stored in a memory 204, or other non-transitory computer readable medium, and executable by a processor 202, such as the processor 202 and memory 204 described below with respect to FIG. 4, to cause the processor 202 to, or otherwise be operative to, upon the occurrence of the event, forward at least a subset of the stored received incoming orders to the match engine 106. The collector 520 may be a component that may receive the output from the engine and correlate the messages to in the inbound orders/quotes in order to measure performance. There may be additional infrastructure inline performing the capture in order to provide high-resolution timing for each message as seen by the exchange and consumer.

Figure 6:
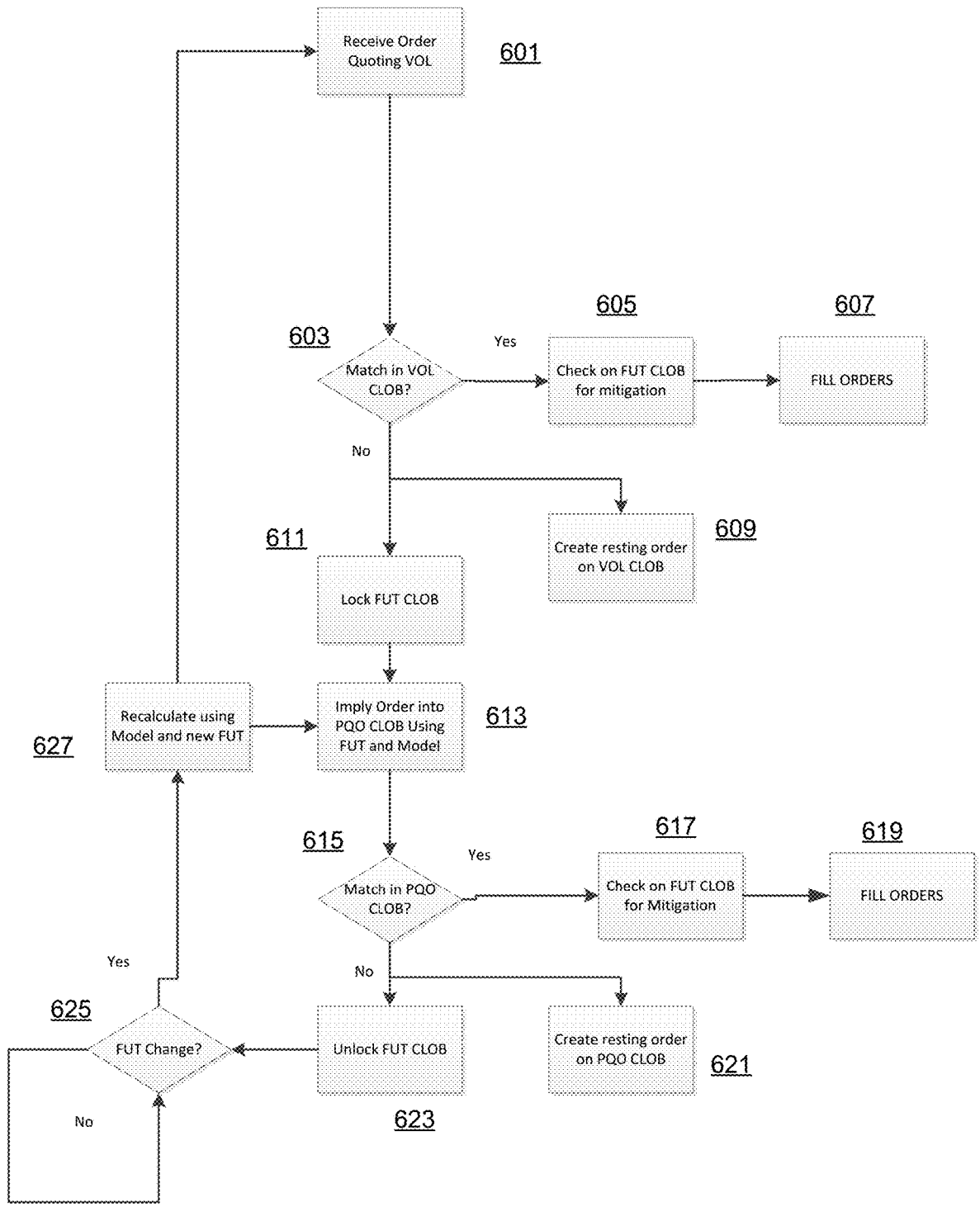
FIG. 6 depicts a flow chart showing exemplary operation of the system of FIGS. 1 and 5.

FIG. 6 depicts a flow chart showing operation of the system 500 of FIG. 5. In particular FIG. 5 shows a computer implemented method of triangulating orders in an electronic trading system 100, the electronic trading system 100 comprising a match engine 106 that implements a market for an associated financial instrument by being operative to attempt to match an incoming order for a transaction for the associated financial instrument with at least one other previously received but unsatisfied order for a transaction counter thereto for the associated financial instrument, to at least partially satisfy one or both of the incoming order or the at least one other previously received order.

At block 601, the system receives an incoming transaction. The transaction may be an order quoted in volatility. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument that the electronic market is established to trade. The transaction may be alternatively an order quoted in premiums, and/or a futures order.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described above with respect to FIG. 2. Data may be stored relating received transactions for a period of time, indefinitely, or for a rolling most recent time period such that the stored data is indicative of the market participant's recent activity in the electronic market.

In an embodiment, a received order may already be standardized to an options pricing model known by the exchange. In certain embodiments, the customer may have previously transmitted an options pricing model to the system that may use a customized equation for volatility. Volatility is a statistical measurement of the degree of fluctuation of a market or security. Implied volatility is the volatility as implied by the market price of the option. The implied volatility is calculated using an option pricing model, such as the Black model, in which a mathematical relationship between the volatility of the underlying security and the price of its options has been established. Implied volatility is the market's opinion of the volatility of the option's underlying security and is determined using the following information: the price of the underlying security, the market price of the option, the strike price of the option, the expiration date of the option, the interest rate, if applicable, and the dividend yield, if applicable.

Implied volatility and premiums are related through use of options pricing models. For example, using a pricing model, the implied volatility of an option may be backed out of the price of the option. Models such as Black, Whaley, or Merton (or customized models) allow a trader or exchange to use implied volatility to evaluate an options price or vice versa. Each customer, however, may use a different model to calculate volatility.

In certain embodiments, if the customer is using a customized model that is stored in memory on the exchange system, the exchange system may normalize volatility to that of a standard model such as Black, Whaley, Merton, or Bjerksund. The exchange system may store multiple customized model for each customer such as variations on the above listed models, binomial models, trinomial models, among others. The transaction may include the model or a model identification that the order is quoted in.

At block 603, the match engine determines if there is a match in the VQO CLOB for the order. As mentioned above, the match engine may use one or more matching algorithms or allocation algorithms to determine matches. If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order.

If there is a match, the process moves to block 605 where an order is implied into the FUT CLOB. This second order is implied for an opposite-side-of-the-market futures trade. Together, the option and the future comprise a delta-neutral option-future combination. Certain options may include infinite risk. For example, for a naked call, the theoretical risk is infinite. The customer is responsible for the difference between the strike price and the amount the instrument moves above this price. Because there isn't a limit to how high a price can trade, the potential loss is infinite. In existing systems, this order may be made separately from the volatility quoted order. A customer may have to anticipate the FUT CLOB in order to determine how to mitigate risk. With triangulation, the FUT CLOB is known to the match engine, and as such offers transparent mitigation options at the time the volatility quoted order is matched. A benefit to this system is that a customer may quote larger orders in volatility than are currently quoted knowing that they may always be covered though triangulation of the FUT CLOB. Under the existing systems, a customer may quote a bid size of 1000. After that is matched, a customer may then need to quote the delta necessary bid size over on the FUT market. The size required to mitigate at the price desired may not be available. With triangulation, the customer may feel safe quoting any size bid in the volatility market, knowing that the match may only occur when there are available orders on the FUT market to mitigate the risk. Block 603 and Block 605 may occur simultaneously. With triangulation, the matching engine may be configured to identify the potential implied FUT order while identifying a match in the VQO CLOB. While an order is being implied into the FUT CLOB, the futures market may be locked.

At block 607, the orders are filled. Match event data, reflecting the result of this matching process, may be generated. The collector or a message generator may transmit or otherwise manage communications of one or more financial data messages to a plurality of market participants via a network, each of the plurality of financial data messages comprising, for example, data indicative of the filled order, a change in state of an electronic marketplace for one or more financial products, e.g. market data, such as based on received orders and/or cancellation thereof, matched trades, price changes, etc. The plurality of financial data messages may include message types which carry data representative of, or otherwise represent the marketplace, or changes to the state thereof, in different ways such as market by order messages, market by price messages, top of book messages, analytics messages, or other representations or combinations thereof. A recipient may receive all, or otherwise choose among, the different available message types/market representations. Financial data messages, or a series thereof, of a particular type may be referred to as a stream or market data stream, e.g. a market by order stream, a market by price stream, a top of book stream, etc. These market data streams may be independently generated, subscribed to and modified according to the disclosed embodiments. Alternatively, one or more of these data streams may be generated in a combined fashion. As used herein, the plurality of financial messages may refer all financial data messages generated as described wherein one or more subsets of the plurality of financial data messages may be of a particular type.

At block 609 if the match engine does not identify a suitable previously received but unsatisfied counter order, or the one or more identified suitable previously received but unsatisfied counter orders are for a lesser quantity than the incoming order, the incoming order is placed on the VQO CLOB, referred to as "resting", with original or remaining unsatisfied to await a subsequently received suitable order counter thereto. An implied order may also be left on the FUT CLOB.

At block 611, if no match is found in the VQO CLOB, the FUT market may be locked. Locked may refer to the market or priced being frozen at a certain point in time. The current FUT price may be used in subsequent calculations which requires that the price be locked until any models that use the FUT price have been executed and implication into the PQO CLOB is complete. The FUT market may be locked by only calculating or reporting a price at a certain interval. For example, if the FUT market is only updated every seconds, then between seconds, the market would appear to be frozen or locked. The time needed to calculate and imply an order into the PQO CLOB may regulate how the FUT market is updated.

In certain embodiments, the FUT market is locked after receiving a message from the match engine. The FUT market may be unlocked after a certain period of time or after receiving a message or command to unlock.

At block 613, an implied order is generated using the model and the current futures price. The order is implied into the PQO CLOB. Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items. This has the potential of attracting additional traders. Exchanges benefit from increased transaction volume. Transaction volume may also increase as the number of matched trade items increases.

At block 615, the match engine determines if there is a match in the PQO CLOB for the order. As mentioned above, the match engine may use one or more matching algorithms or allocation algorithms to determine matches. In one embodiment the matching algorithms may comprise a pro-rata algorithm, a first in first out ("FIFO") algorithm, a Price Explicit Time algorithm, an Order Level Pro Rata algorithm, an Order Level Priority Pro Rata algorithm, a Preference Price Explicit Time algorithm, a Preference Order Level Pro Rata algorithm, a Preference Order Level Priority Pro Rata algorithm, a Threshold Pro-Rata algorithm, a Priority Threshold Pro-Rata algorithm, a Preference Threshold Pro-Rata algorithm, a Priority Preference Threshold Pro-Rata algorithm, a Split Price-Time Pro-Rata algorithm, or combinations thereof If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the PQO CLOB with their remaining quantity to await a subsequent suitable counter order, i.e. to resting quantity, to await a subsequently received suitable order counter thereto.

If there is a match, the process moves to block 617 where an order may be implied into the FUT CLOB. This second order is implied for an opposite-side-of-the-market futures trade. Together, the option and the future comprise a delta-neutral option-future combination. Certain options may include infinite risk. For example, for a naked call, the theoretical risk is infinite. The customer is responsible for the difference between the strike price and the amount the instrument moves above this price. Because there isn't a limit to how high a price can trade, the potential loss is infinite. In existing systems, this order may be made separately from the volatility quoted order. A customer may have to anticipate the FUT CLOB in order to determine how to mitigate risk. With triangulation, the FUT CLOB is known to the match engine, and as such offers transparent mitigation options at the time the PQO is matched. A benefit to this system is that a customer may quote larger orders than are currently quoted knowing that they may always be covered though triangulation of the FUT CLOB. Under the existing systems, a customer may quote a bid size of 1000. After that is matched, a customer may then need to quote the delta necessary bid size over on the FUT market. The size required to mitigate at the price desired may not be available. With triangulation, the customer may feel safe quoting any size bid in the market, knowing that the match may only occur when there are available orders on the FUT market to mitigate the risk. Block 525 and Block 540 may occur simultaneously. With triangulation, the matching engine may be configured to identify the potential implied FUT order while identifying a match in the PQO CLOB.

At block 619, any matched orders are filled/completed. Because this is an implied order, filling (or completing) this order may affect an original order that may be resting on the VQO CLOB. Match event data, reflecting the result of this matching process, may be generated. The collector or a message generator may transmit or otherwise manage communications of one or more financial data messages to a plurality of market participants via a network, each of the plurality of financial data messages comprising, for example, data indicative of the filled order, a change in state of an electronic marketplace for one or more financial products, e.g. market data, such as based on received orders and/or cancellation thereof, matched trades, price changes, etc. The plurality of financial data messages may include message types which carry data representative of, or otherwise represent the marketplace, or changes to the state thereof, in different ways such as market by order messages, market by price messages, top of book messages, analytics messages, or other representations or combinations thereof. A recipient may receive all, or otherwise choose among, the different available message types/market representations. Financial data messages, or a series thereof, of a particular type may be referred to as a stream or market data stream, e.g. a market by order stream, a market by price stream, a top of book stream, etc. These market data streams may be independently generated, subscribed to and modified according to the disclosed embodiments. Alternatively, one or more of these data streams may be generated in a combined fashion. As used herein, the plurality of financial messages may refer all financial data messages generated as described wherein one or more subsets of the plurality of financial data messages may be of a particular type.

At block 621 if the match engine does not identify a suitable previously received but unsatisfied counter order, or the one or more identified suitable previously received but unsatisfied counter orders are for a lesser quantity than the incoming order, the incoming order is placed on the PQO CLOB, referred to as "resting", with original or remaining unsatisfied to await a subsequently received suitable order counter thereto At block 623, the FUT market is unlocked. Depending on the mechanism involved, the FUT market may unlock automatically after a certain amount of time.

At block 625, the futures market is observed for any changes. If the market changes, the process moves to block 627. Until the market changes, the futures market is continuously watched.

At block 627, once the future price has changed, the implied orders is re-calculated using the new FUT price and a standard options pricing model (or a previously received and stored customized model). In existing systems, a trader may have had to maintain these order themselves which involves large amounts of messaging and communications between the trader and the exchange. By calculating and re-calculating these order on the exchange side, this decreases the amount of traffic going back and forth between the exchange and the trader.

This loop may repeat until a match is made on any of the books or the order is withdrawn. If the FUT price changes enough to affect volatility, the system may receive new quotes from a customer.

The scenario described by FIG. 6 illustrates an example where a customer has submitted an order quoting volatility and the order is then implied into the PDO CLOB. An example of this scenario is shown below in CALL Scenario #1. Two additional scenarios are described below which involve triangulation between the three books. In each of these scenarios there is the assumption that time to expiration=24 days, the interest rate is 1%, and the orders involve European style options.

CALL Scenario #1: Customer quoting the Vol market and implying into the PQO.
Given—
|Futures Book|PQO 135 strike Call|
-------------------------------------------------------------
|10 @ 1.3500/None|Empty|
Vol Book: Empty
Configuration: Imply into PQO CLOB
When—
1: Bid Vol 30 @ 10.00
2: Offer Vol 50 @ 10.05
Then—
1: VQO CLOB Bid 30 @ 10.00
2: VQO CLOB Offer 50 @ 10.05
3: PQO CLOB Implies Bid 20 @ 0.0138
Note: PQOImpliedBidQty=_min(VQOBidQty, FutureBidQty/Delta)=_min(30, 10/0.505093)=_min(30, 19.798)=20

For CALL Scenario #1, the customer quotes the Vol market with a bid of 30@10.00 and an offer of 50@10.05. Both these orders are added to the VQO CLOB in #1 and #2. Next, an offer is implied into the PQO CLOB. This is limited to 20@0.0138 due to the requirement that the Vol quote be mitigated with an opposite-side-of-the-market futures trade. The PQOImpliedBidQty is therefore limited to 20 as the lesser of 30 or the available futures market to mitigate.

In certain embodiments orders may be received quoting premiums and implied into the volatility market or futures market. A customer may quote the futures market and imply into the Vol or PQO market. A customer may quote the Vol market and be implied into both the PQO market and the futures market. Triangulation allows for each of the three books to imply into one another, increasing liquidity in each market.

CALL Scenario #2 below describes a situation where a customer quotes the Vol Market and is implied into the Futures CLOB.
Given:
|Futures Book|PQO ¿ 135 strike Call|
-------------------------------------------------------------
|10 @ 1.3500/None|None/40 @ 0.0142|
Vol Book: Empty
Configuration: Imply into Futures CLOB
When—
1: Bid Vol 30 @ 10.00
2: Offer Vol 50 @ 10.05
Then—
1: VQO CLOB Bid 30 @ 10.00
2: VQO CLOB Offer 50 @ 10.05
3: Futures CLOB Implies Offer 15 @ 1.3508
Note: Future Qty=_min(Delta*PQOAskQty, Delta*QOBidQty)=_min(0.514306*40,0.514306*30)=_min(20.57724, 15.42918)

For CALL Scenario #2, the customer quotes the Vol market with a bid of 30@10.00 and an offer of 50@10.05. Both these orders are added to the VQO CLOB in #1 and #2. Next, at #3 an offer is implied into the Futures CLOB. For mitigation reasons, the order implied into the Futures CLOB is limited to 15@1.3508.

CALL Scenario #3: Customer quoting the Vol market and implying into the Futures and Premium. Given:
|Futures Book|PQO ¿ 135 strike Call|
-------------------------------------------------------------
|10 @ 1.3500/30 @ 1.3502|20 @ 0.0136–40 @ 0.0142|
Vol Book: Empty
Configuration: Imply into Futures and Premium
When—
1: Bid Vol 30 @ 10.00
2: Offer Vol 50 @ 10.05
Then—
1: VQO CLOB Bid 30 @ 10
2: VQO CLOB Offer 50 @ 10.05
3: Futures CLOB Implies Bid 10 @ 1.3494
Note: FutureQty=PQODelta*PQOBidQty=0.498237*20=9.964)
4: Futures CLOB Implies Offer 20 @ 1.3508 or 21 @ 1.3508 (qty round up)
Note: FutureQty=PQODelta*PQOAskQty=0.514306*40=20.57724)
5: PQO CLOB Implies Bid 20 @ 0.0138
Note: PQOImpliedBidQty=_min(Delta*VQOBidQty, FutureBidQty/Delta)=_min(30, 10/0.505093)=_min(15.15279, 19.798)=15
6: PQO CLOB Implies Offer 50 @ 0.0140
Note: PQOImpliedAskQty=_min(Delta*VQOAskQty, FutureAskQty/Delta)=_min(50, 30/0.507411)=_min(50, 59.12366)=50

For CALL Scenario #3, the customer quotes the Vol market with a bid of 30@10.00 and an offer of 50@10.05. Both these orders are added to the VQO CLOB in #1 and #2. A 20 @ 0.0138 bid and 50 @ 0.0140 offer are implied into the PQO CLOB.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
   receiving, from a client computer by the order processor via an electronic communications network, a first electronic data transaction request message comprising data indicative of a first order specifying a first product, first side, first quantity and a first value characterized by a first convention;
   determining, by a hardware matching processor, coupled with the order processor, based on the first value, that the first order does not fully match with a previously received but unsatisfied order counter to the first order stored in a first order book data structure stored in the memory which stores previously received but unsatisfied orders for the first product each having a value characterized by the first convention;
   based on the determination, automatically:
      retrieving, by the order processor from a memory coupled therewith, a model previously received from the client computer and unique thereto and which enables conversion, as a function of a condition to be determined subsequent to the receipt of the model, by the order processor of the first value characterized by the first convention to a plurality of second values characterized by a second convention related to the first convention;
      locking, by the order processor, the first order book data structure to prevent modifications thereto;
      determining, by the order processor, a current value of the condition and generating, based thereon using the retrieved model, a plurality of first implied orders, based on a remaining quantity of the first order, each of the plurality of first implied orders specifying the second product, a second quantity, and one of the plurality of second values characterized by the second convention;
      matching, by the hardware matching processor based on the second value, one or more of the plurality of first implied orders with one or more previously received but unsatisfied orders counter thereto stored in a second order book data structure and specifying a second quantity;
      completing, by the order processor, both the matched portion of the first order and any of the previously received but unsatisfied orders for the second product which matched any of the plurality of first implied orders;
      unlocking, by the order processor, the first order book data structure to enable modifications thereto; and
      storing, by the order processor in the second order book data structure, data indicative of any of the plurality of first implied orders which did not match any of the previously received but unsatisfied orders for the second product.

2. The computer implemented method of claim 1, wherein the first convention comprises the first value being a volatility value, the second convention comprises the first value being a premium value, the method further comprising:
   generating, automatically by the order processor based on the completion of the first order, a second implied order specifying a third product, a second side opposite the first side, the first quantity, and a third value in a third order book data structure, the third product related to the first product, the second implied order, when completed, being characterized by a second risk value wherein a net risk value of the first and second risk values is less than the first risk value; and,
   wherein the second implied order is a futures order.

3. The computer implemented method of claim 2, wherein the first order and the second implied order comprise a delta-neutral option-future combination.

4. The computer implemented method of claim 3, wherein the amount of the first order completed is limited to the size of the second implied order completed in order to comprise the delta-neutral option-future combination.

5. The computer implemented method of claim 4, wherein the unmatched quantity of the first order resulting from unmatched quantity of the plurality of first implied orders is left as a resting order on the first order book data structure, and the second implied order is based on the remaining partially completed first order.

6. The computer implemented method of claim 1, further comprising:
   determining, automatically periodically by the order processor, whether the condition has changed and, based thereon:

retrieving, from the memory by the order processor, the model previously received from the first client computer;

locking, by the order processor, the first order book data structure;

determining, by the order processor, the current value of the condition and updating, based thereon using the retrieved model, the second values any of the plurality of first implied orders stored in the second order book data structure; and unlocking, by the order processor, the first order book data structure.

7. The computer implemented method of claim 1, wherein the wherein the model comprises an options pricing model including Whaley, Black, or Bjerksund.

8. A system comprising:

a processor and a memory coupled therewith, the memory storing computer executable instructions that when executed by the processor cause the processor to:

receive, from a client computer coupled with the processor via an electronic communications network, a first electronic data transaction request message comprising data indicative of a first order specifying a first product, first side, first quantity and a first value characterized by a first convention;

determine, by a hardware matching processor coupled with the processor, based on the first value, that the first order does not fully match with a previously received but unsatisfied order counter to the first order stored in a first order book data structure, stored in the memory, which stores previously received but unsatisfied orders for the first product each having a value characterized by the first convention;

based on the determination, automatically:

retrieve, from the memory, a model previously received from the client computer and unique thereto and which enables conversion, as a function of a condition to be determined subsequent to the receipt of the model, by the processor of the first value characterized by the first convention to a plurality of second values characterized by a second convention related to the first convention;

lock the first order book data structure to prevent modifications thereto;

determine a current value of the condition and generating, based thereon using the retrieved model, a plurality of first implied orders, based on a remaining quantity of the first order, each of the plurality of first implied orders specifying the second product, a second quantity, and one of the plurality of second values characterized by the second convention;

match, by the hardware matching processor based on the second value, one or more of the plurality of first implied orders with one or more previously received but unsatisfied orders counter thereto stored in a second order book data structure and specifying a second quantity;

complete both the matched portion of the first order and any of the previously received but unsatisfied orders for the second product which matched any of the plurality of first implied orders;

unlock the first order book data structure to enable modifications thereto; and store, in the second order book data structure, data indicative of any of the plurality of first implied orders which did not match any of the previously received but unsatisfied orders for the second product.

9. The system of claim 8, wherein the first convention comprises the first value being a volatility value, the second convention comprises the first value being a premium value, the computer executable instructions being further operative to cause the processor to:

generate, automatically based on the completion of the first order, a second implied order specifying a third product, a second side opposite the first side, the first quantity, and a third value in a third order book data structure, the third product related to the first product, the second implied order, when completed, being characterized by a second risk value wherein a net risk value of the first and second risk values is less than the first risk value; and, wherein the second implied order is a futures order.

10. The system of claim 9, wherein the first order and the second implied order comprise a delta-neutral option-future combination.

11. The system of claim 10, wherein the amount of the first order completed is limited to the size of the second implied order completed in order to comprise the delta-neutral option-future combination.

12. The system of claim 11, wherein the unmatched quantity of the first order resulting from unmatched quantity of the plurality of first implied orders is left as a resting order on the first order book data structure, and the second implied order is based on the remaining partially completed first order.

13. The system of claim 8, wherein the computer executable instructions are further operative to cause the processor to:

determine, automatically periodically, whether the condition has changed and, based thereon:

retrieve, from the memory, the model previously received from the first client computer;

lock the first order book data structure;

determine the current value of the condition and update, based thereon use the retrieved model, the second values any of the plurality of first implied orders stored in the second order book data structure; and unlock the first order book data structure.

14. The system of claim 8, wherein the wherein the model comprises an options pricing model including Whaley, Black, or Bjerksund.

15. A system comprising:

means for receiving, from a client computer via an electronic communications network, a first electronic data transaction request message comprising data indicative of a first order specifying a first product, first side, first quantity and a first value characterized by a first convention;

means for determining, based on the first value, that the first order does not fully match with a previously received but unsatisfied order counter to the first order stored in a first order book data structure stored in the memory which stores previously received but unsatisfied orders for the first product each having a value characterized by the first convention;

means for retrieving based on the determination, from a memory coupled therewith, a model previously received from the client computer and unique thereto and which enables conversion, as a function of a condition to be determined subsequent to the receipt of the model, by the order processor of the first value characterized by the first convention to a plurality of second values characterized by a second convention related to the first convention;

means for locking the first order book data structure to prevent modifications thereto;

means for determining a current value of the condition and generating, based thereon using the retrieved model, a plurality of first implied orders, based on a remaining quantity of the first order, each of the plurality of first implied orders specifying the second product, a second quantity, and one of the plurality of second values characterized by the second convention;

means for matching, based on the second value, one or more of the plurality of first implied orders with one or more previously received but unsatisfied orders counter thereto stored in a second order book data structure and specifying a second quantity;

means for completing both the matched portion of the first order and any of the previously received but unsatisfied orders for the second product which matched any of the plurality of first implied orders;

means for unlocking the first order book data structure to enable modifications thereto; and means for storing, in the second order book data structure, data indicative of any of the plurality of first implied orders which did not match any of the previously received but unsatisfied orders for the second product.

16. The system of claim 15, wherein the first convention comprises the first value being a volatility value, the second convention comprises the first value being a premium value, the system further comprising:

means for generating, automatically based on the completion of the first order, a second implied order specifying a third product, a second side opposite the first side, the first quantity, and a third value in a third order book data structure, the third product related to the first product, the second implied order, when completed, being characterized by a second risk value wherein a net risk value of the first and second risk values is less than the first risk value; and, wherein the second implied order is a futures order.

17. The system of claim 16, wherein the first order and the second implied order comprise a delta-neutral option-future combination.

18. The system of claim 17, wherein the amount of the first order completed is limited to the size of the second implied order completed in order to comprise the delta-neutral option-future combination.

19. The system of claim 18, wherein the unmatched quantity of the first order resulting from unmatched quantity of the plurality of first implied orders is left as a resting order on the first order book data structure, and the second implied order is based on the remaining partially completed first order.

20. The system of claim 15, further comprising:

means for determining, automatically periodically, whether the condition has changed and, based thereon:

means for retrieving, from the memory, the model previously received from the first client computer;

means for locking the first order book data structure;

means for determining the current value of the condition and updating, based thereon using the retrieved model, the second values any of the plurality of first implied orders stored in the second order book data structure; and means for unlocking the first order book data structure.

* * * * *